(12) United States Patent
Bastaldo-Tsampalis et al.

(10) Patent No.: US 10,242,476 B2
(45) Date of Patent: Mar. 26, 2019

(54) METHODS AND SYSTEMS FOR DYNAMICALLY REPRESENTING, WITHIN A VIRTUAL REALITY DATA STREAM BEING PRESENTED TO A USER, A PROXY OBJECT THAT CORRESPONDS TO AN OBJECT IN THE REAL-WORLD ENVIRONMENT OF THE USER

(71) Applicant: Verizon Patent and Licensing Inc., Arlington, VA (US)

(72) Inventors: Brigitte Bastaldo-Tsampalis, Bridgewater, NJ (US); Yuk Lun Li, Morganville, NJ (US); Ning Zhang, Warren, NJ (US)

(73) Assignee: Verizon Patent and Licensong Inc., Basking Ridge, NJ (US)

( * ) Notice: Subject to any disclaimer, the term of this patent is extended or adjusted under 35 U.S.C. 154(b) by 0 days.

(21) Appl. No.: 15/610,557

(22) Filed: May 31, 2017

(65) Prior Publication Data
US 2018/0350118 A1    Dec. 6, 2018

(51) Int. Cl.
*G06T 11/60* (2006.01)
*G06K 9/00* (2006.01)

(52) U.S. Cl.
CPC .......... *G06T 11/60* (2013.01); *G06K 9/00671* (2013.01)

(58) Field of Classification Search
CPC .... G06T 11/60; G06T 19/006; G06K 9/00671
See application file for complete search history.

(56) References Cited

U.S. PATENT DOCUMENTS

| | | | | |
|---|---|---|---|---|
| 2012/0142415 | A1* | 6/2012 | Lindsay | G06T 19/006 463/33 |
| 2013/0249947 | A1* | 9/2013 | Reitan | G06F 3/011 345/633 |
| 2015/0301592 | A1* | 10/2015 | Miller | G06F 3/011 345/156 |
| 2015/0338915 | A1* | 11/2015 | Publicover | G06F 21/64 345/633 |
| 2016/0041391 | A1* | 2/2016 | Van Curen | G02B 27/0172 345/633 |
| 2016/0350973 | A1* | 12/2016 | Shapira | G06T 19/006 |
| 2017/0116788 | A1* | 4/2017 | Chenglei | H04N 13/351 |
| 2017/0372499 | A1* | 12/2017 | Lalonde | G02B 27/017 |
| 2018/0122142 | A1* | 5/2018 | Egeler | G06T 19/006 |

\* cited by examiner

*Primary Examiner* — Jeffery A Brier

(57) ABSTRACT

An exemplary virtual reality system presents virtual reality media content including representations of a plurality of objects to a user. The system detects a characteristic of a real-world environment of the user as the virtual reality media content is presented to the user and identifies, based on the detected characteristic of the real-world environment, an actionable real-world object included in the real-world environment. In response to the identifying of the actionable real-world object and as the virtual reality media content is presented to the user, the system dynamically integrates a proxy object corresponding to the actionable real-world object with the representations of the plurality of objects included within the virtual reality media content presented to the user. The proxy object may be configured to facilitate an action by the user with respect to the actionable real-world object as the virtual reality media content is being presented.

22 Claims, 12 Drawing Sheets

METHODS AND SYSTEMS FOR DYNAMICALLY REPRESENTING, WITHIN A VIRTUAL REALITY DATA STREAM BEING PRESENTED TO A USER, A PROXY OBJECT THAT CORRESPONDS TO AN OBJECT IN THE REAL-WORLD ENVIRONMENT OF THE USER

BACKGROUND INFORMATION

Virtual reality technology allows users of virtual reality media player devices to experience immersive virtual reality worlds that are distinct from environments in which the users are located in the real world. For example, a user experiencing virtual reality may look around an immersive virtual reality world in any direction (e.g., forward, backward, left, right, up, down, etc.), move a virtual viewpoint (e.g., a virtual avatar) around within the immersive virtual reality world, interact with virtual representations of people and/or objects included within the immersive virtual reality world, and so forth. In these and other ways, virtual reality media content presented to the user may give the user a sense that he or she is actually present in and experiencing the immersive virtual reality world, rather than experiencing the real-world environment in which the user is actually located. As such, the user may be isolated or detached from the real-world environment to some extent (e.g., at least in terms of what the user sees, if not also what the user hears and otherwise experiences) while experiencing the immersive virtual reality world.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
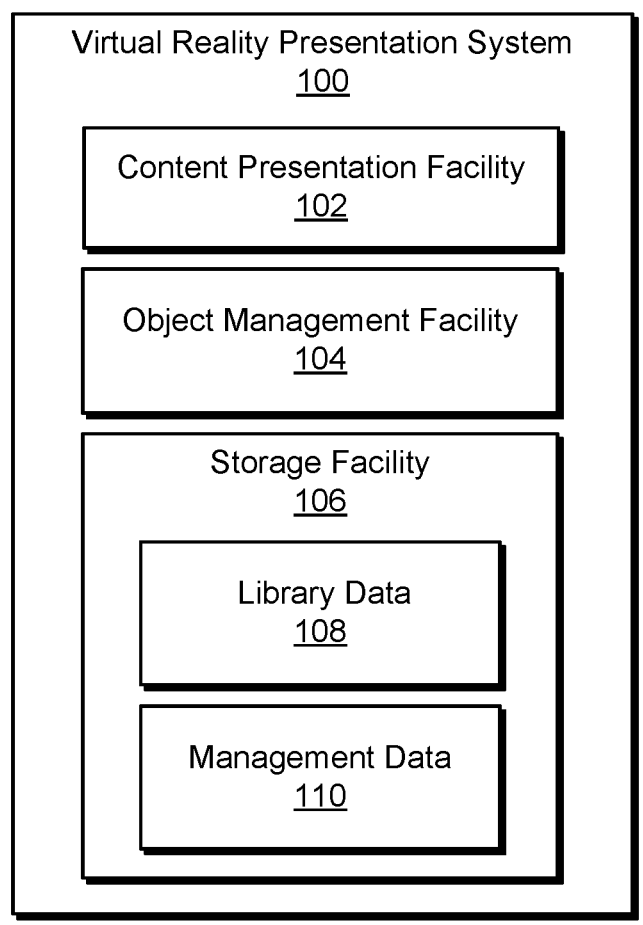
FIG. 1 illustrates an exemplary virtual reality system for dynamically representing, within virtual reality media content being presented to a user, a proxy object that corresponds to a real-world object included in a real-world environment of the user according to principles described herein.

Methods and systems for dynamically representing, within virtual reality media content being presented to a user (e.g., a viewer or experiencer of virtual reality media content), a proxy object that corresponds to a real-world object included in a real-world environment of the user (e.g., a real-world environment in which the user is located and/or that surrounds the user as the virtual reality media content is presented to the user) are described herein. Methods and systems described herein may represent, within the virtual reality media content, one or more proxy objects corresponding to real-world objects around the user such that the user, while experiencing the virtual reality media content, can confidently move about within and interact with real-world objects included in the real-world environment while avoiding inadvertent negative interactions with certain real-world objects (e.g., accidently bumping into real-world objects such as walls, trees, etc.) and while more easily and conveniently having positive interactions with other real-world objects (e.g., manipulating real-world objects such as doorknobs, safely navigating real-world objects such as stairways, etc.). As will be described below, the avoidance and/or facilitation of these types of negative and/or positive interactions with real-world objects may be referred to herein as "actions" that the user may perform with respect to the real-world objects.

In certain implementations, as will be described and illustrated in more detail below, an exemplary virtual reality system may present, to a user of the virtual reality system, virtual reality media content including representations of a plurality of objects. The virtual reality system may detect a characteristic of a real-world environment that surrounds the user as the virtual reality media content is presented to the user. For instance, the virtual reality system may detect, based on data captured by sensors and/or data accessed from a storage facility of the virtual reality system and/or from another system, that the real-world environment corresponds to a particular geographical location, that the real-world environment is associated with particular features (e.g., includes particular physical features, has a particular floorplan, etc.), that particular real-world objects are disposed at particular positions within the real-world environment, that the user is moving through the real-world environment in a particular way (e.g., the user is facing a certain direction, the user is walking in a certain direction, etc.), and so forth.

Based on the detected characteristic of the real-world environment, the virtual reality system may identify an actionable real-world object included in the real-world environment. For example, the virtual reality system may identify a real-world object relatively proximate to the user that the user may inadvertently bump into as the user moves about in the real-world environment while experiencing the virtual reality media content. As another example, the virtual reality system may identify a real-world object in the real-world environment that the user may desire to interact with in a productive and intentional way. As a result, in response to the identifying of the actionable real-world object and as the virtual reality media content is presented to the user, the virtual reality system may dynamically integrate a proxy object corresponding to the actionable real-world object with the representations of the plurality of objects included within the virtual reality media content presented to the user. It is to be understood that the proxy object does not need to replicate the object in the real-world environment but may be depicted as a related object (e.g., a fence in place of a wall) or a completely different object that is more appropriate for the virtual reality environment (e.g., a tree in place of a brick wall in an outdoor virtual environment).

In some examples, the dynamically integrated proxy object may be configured to facilitate an action by the user with respect to the actionable real-world object as the virtual reality media content is presented to the user. It is to be understood, that while the dynamically integrated proxy object is configured to facilitate an action by the user, the user may or may not take action in response to the proxy object. For instance, if the actionable real-world object is an object that the virtual reality system determines the user may inadvertently bump into as the user moves about in the real-world environment, the virtual reality system may dynamically integrate into the virtual reality media content a proxy object that has a similar apparent size and position within an immersive virtual reality world associated with the virtual reality media content as the size and position of the actionable real-world object in the real-world environment. As such, the user may confidently move about in the real-world environment despite the fact that the user may not be able to directly see (and thereby avoid bumping into) the real-world objects around him or her. The user may take note of the proxy object during the virtual reality experience and take the proxy object into account (i.e., avoid bumping into the proxy object) while remaining immersed in the virtual reality experience. For example, the user may naturally walk around one proxy object to thereby avoid bumping into a corresponding real-world object, and/or may naturally manipulate or navigate another proxy object to thereby engage in desirable interactions with another corresponding real-world object.

As described above and as will be further made apparent by the description below, methods and system for dynamically representing proxy objects corresponding to real-world objects described herein may provide various benefits to users and providers of virtual reality media content alike. For example, while virtual reality media content may have the ability to virtually transport users to other worlds (e.g., by making users feel immersed in virtual reality worlds and detached from real-world environments in which they are actually located), the immersiveness of virtual reality media content may be diminished by the manner in which conventional virtual reality systems may require the user to interact with virtual reality media content being presented. For example, while the user may shift his or her field of view within the immersive virtual reality world by way of natural head movements, less natural or intuitive controls (e.g., controllers, joysticks, etc.) may be used for navigating a virtual viewpoint of the user within the immersive virtual reality world. Advantageously, disclosed methods and systems may make possible and/or otherwise facilitate virtual reality experiences in which a user interacts with the virtual reality media content in natural and immersive ways. For example, along with using natural head movements to shift a field of view of an immersive virtual reality world (i.e., to look around to different parts of the immersive virtual reality world at different times), a user benefitting from methods and systems described herein may further be enabled to navigate his or her virtual viewpoint within the immersive virtual reality world by naturally moving about (e.g., walking around, jogging through, etc.) the real-world environment in which he/she is located as the virtual reality media content is presented.

Accordingly, while users have conventionally experienced virtual reality media content from a seated position or by standing in a single position (e.g., 360° video) or in a relatively small area, users benefitting from methods and systems described herein may enjoy increasingly immersive virtual reality experiences and/or new types of virtual reality experiences (e.g., virtual reality experiences that provide exercise for the user, etc.) in which the users may move about freely in a real-world environment (e.g., an indoor or an outdoor real-world environment) and/or may enjoy natural, immersive, and active control of how virtual viewpoints move through immersive virtual reality worlds. Users may enjoy the benefits of moving about during virtual reality experiences and being untethered from a single position all while feeling safe and confident that, as long as the users avoid bumping into virtual objects presented in the immersive virtual reality world, the users will not inadvertently bump into real-world objects in the real-world environment.

Providers of virtual reality media content may also benefit from methods and systems described herein. For example, providers may implement self-learning, artificial reality, and/or other techniques described in more detail below to enable increasingly customized, realistic, and effective virtual reality media content to be provided to users.

Various embodiments will now be described in more detail with reference to the figures. The disclosed methods and systems may provide one or more of the benefits mentioned above and/or various additional and/or alternative benefits that will be made apparent herein.

FIG. 1 illustrates an exemplary virtual reality system 100 ("system 100") for dynamically representing, within virtual reality media content being presented to a user, a proxy object that corresponds to a real-world object included in a real-world environment of the user. As shown, system 100 may include, without limitation, a content presentation facility 102, an object management facility 104, and a storage facility 106 selectively and communicatively coupled to one another. It will be recognized that although facilities 102 through 106 are shown to be separate facilities in FIG. 1, facilities 102 through 106 may be combined (e.g., combined into a single facility) or divided into more facilities in any way that may serve a particular implementation. In some examples, each of facilities 102 through 106 may be distributed between multiple computing devices (e.g., computing devices on both a server side and a client side of a server/client virtual reality transmission) and/or multiple locations as may serve a particular implementation. Additionally, in certain implementations of system 100, certain facilities shown in FIG. 1 (and the associated functionality associated with such facilities) may be omitted from system 100. Each of facilities 102 through 106 will now be described.

Content presentation facility 102 may include one or more physical computing devices (e.g., hardware and/or software components such as processors, memories, communication interfaces, instructions stored in memory for execution by the processors, etc.) that perform various operations that facilitate dynamic representation of proxy objects that correspond to real-world objects within the virtual reality media content in various ways as may serve various particular implementations. For example, content presentation facility 102 may perform operations associated with receiving, generating, transmitting, analyzing, presenting, and/or otherwise processing or handling virtual reality media content (e.g., data stream that carries data representative of virtual reality media content) and/or data associated with virtual reality media content (e.g., data representative of user input, data stored in storage facility 106, data received or generated by content presentation facility 102, etc.). To this end, as will be described in more detail below, content presentation facility 102 may be implemented by or may include a media player device used by a user to experience the virtual reality media content, as well as additional components (e.g., server-side or client-side components) in certain implementations that facilitate the media player device in processing and presenting the virtual reality media content.

Figure 2:
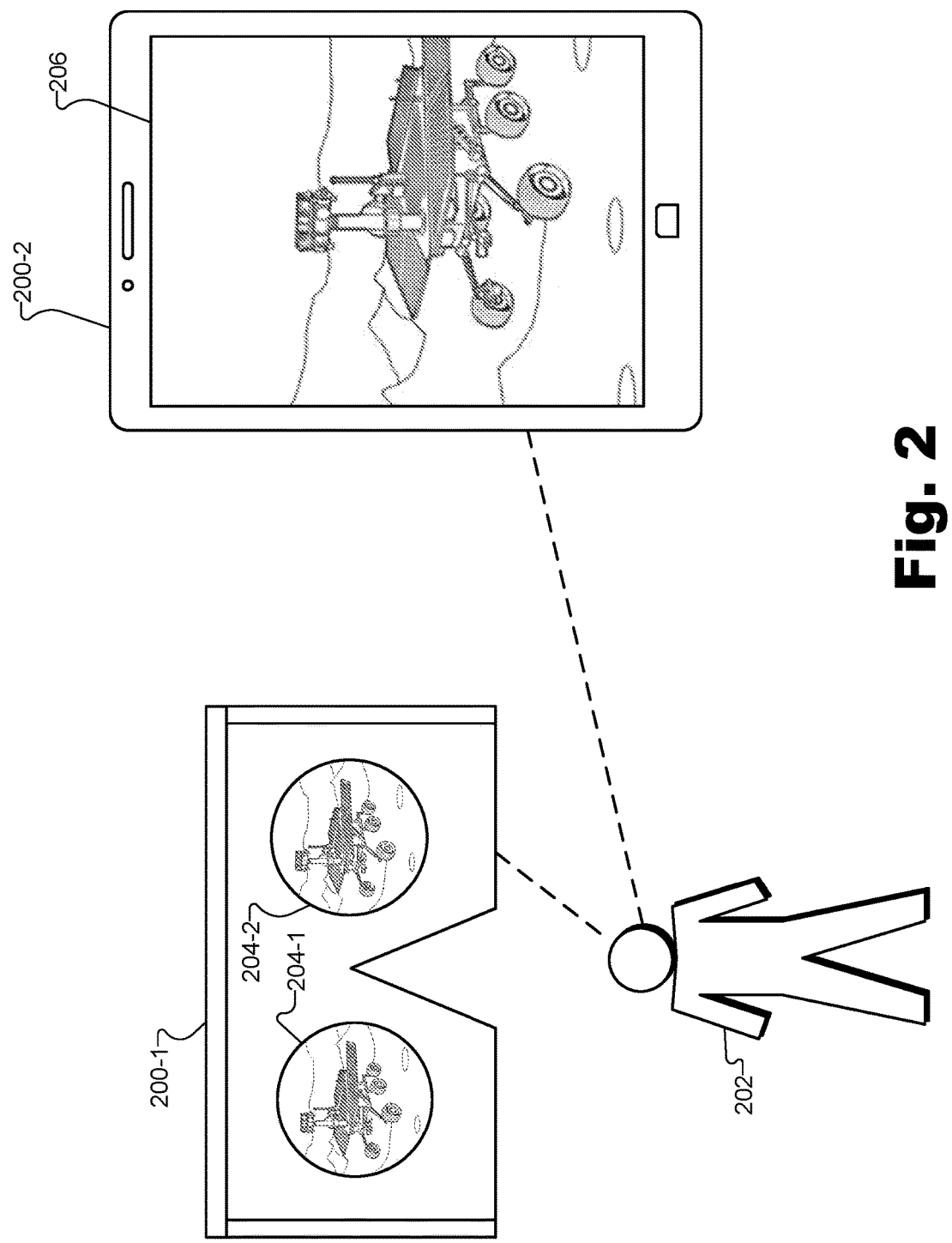
FIG. 2 illustrates exemplary types of media player devices that may implement or be included within the virtual reality system of FIG. 1 for use by a user in experiencing virtual reality media content according to principles described herein.

For example, FIG. 2 illustrates exemplary types of media player devices 200 (i.e., an immersive headset device 200-1 and a mobile computing device 200-2) that may implement or be included within system 100 (e.g., within content presentation facility 102) for use by a user in experiencing virtual reality media content. As shown, different types of media player devices provide different experiences for a user 202 by presenting fields of view in different ways, by receiving user input from user 202 in different ways, and so forth.

Specifically, immersive headset device 200-1 is an exemplary head-mounted virtual reality device that may be mounted on the head of user 202 and arranged so that each of the eyes of user 202 sees a distinct display screen 204 (e.g., display screens 204-1 and 204-2) within immersive headset device 200-1. In some examples, a single display screen 204 may be presented and shared by both eyes of user 202. In other examples, as shown, distinct display screens 204 within immersive headset device 200-1 may be configured to display slightly different versions of a field of view to give user 202 the sense that the virtual reality media content being presented is three-dimensional. Display screens 204 may be configured to fill the peripheral vision of user 202 to help user 202 feel immersed within the immersive virtual reality worlds associated with the virtual reality media content being presented.

In some examples, immersive headset device 200-1 may include motion sensors (e.g., accelerometers), directional sensors (e.g., magnetometers), orientation sensors (e.g., gyroscopes), location sensors (e.g., global positioning system ("GPS") sensors), environmental sensors (e.g., cameras, depth sensors, etc.), and/or other suitable sensors to detect movements of user 202 (e.g., user 202 walking from one location to another, head movements of user 202, etc.) and/or characteristics of the real-world environment of user 202 (e.g., the real-world environment surrounding user 202) as user 202 experiences virtual reality media content. Thus, user 202 may provide input indicative of a desire to move the field of view in a certain direction and by a certain amount by simply turning his or her head in that direction and by that amount. Similarly, user 202 may provide input indicative of a desire to move from one location to another in the immersive virtual reality world by walking from one location to another within the real-world environment. As such, immersive headset device 200-1 may provide user 202 with a natural virtual reality experience (e.g., a hands-free experience that does not require any physical console control).

As another exemplary type of media player device 200, mobile computing device 200-2 may be implemented by a device such as a smartphone, a tablet computer, a mobile reading device, or the like. As shown, mobile computing device 200-2 may have a display screen 206 that may be used by user 202 to experience virtual reality media content. Mobile computing device 200-2 may incorporate certain advantages of immersive headset devices while also providing additional versatility. Specifically, mobile computing device 200-2 may be equipped with the same types of sensors described above in relation to immersive headset device 200-1 and, as such, may be similarly configured to provide user 202 with an immersive experience comparable to that provided by immersive headset devices. For example, mobile computing device 200-2 may be configured to divide display screen 206 into two versions (e.g., stereoscopic versions) of the field of view and to fill the peripheral vision of user 202 when mobile computing device 200-2 is mounted to the head of user 202 using a commercially-available mounting apparatus. In other embodiments, mobile computing device 200-2 may facilitate experiencing virtual reality media content by receiving movement-based user input at arm's length (i.e., not mounted to the head of user 202 but acting as a hand-held dynamic window for experiencing virtual reality media content), by receiving swipe gestures on a touchscreen, or by other techniques as may serve a particular implementation. Additionally, mobile computing devices such as mobile computing device 200-2 are extremely ubiquitous, potentially providing virtual reality access to many people who do not have access to dedicated immersive headset devices such as immersive headset device 200-1.

While examples of certain virtual reality media player devices have been described with respect to FIG. 2, these examples are not limiting. A media player device may include any suitable device and/or configuration of devices configured to facilitate receipt and presentation of virtual reality media content according to principles described herein. For example, a media player device may include a tethered device configuration (e.g., a tethered headset device) or an untethered device configuration (e.g., a display screen untethered from a processing device). As another example, an immersive headset device or other media player device may be used in conjunction with a controller such as a wearable controller (e.g., a ring controller) and/or a handheld controller.

Returning to FIG. 1, content presentation facility 102 may present virtual reality media content to a user (e.g., a user of system 100 such as user 202 of one of media player devices 200). The virtual reality media content may include representations of a plurality of objects such as, for example, virtual objects or virtualized representations of real-world objects that may be included within an immersive virtual reality world associated with the virtual reality media content.

As used herein, an immersive virtual reality world may refer to any real-world-based or artificially-generated space in which a user may be virtually located (e.g., in which a virtual avatar of the user may be located) during a virtual reality experience. For example, certain immersive virtual reality worlds may be based on places or environments within the real world (i.e., as opposed to a virtual or artificially-generated world), other immersive virtual reality worlds may be purely artificially generated, and still other immersive virtual reality worlds may include both artificial and real-world elements. Accordingly, as used herein, an "object" included within virtual reality media content may include anything, whether living or inanimate, that is represented within the immersive virtual reality world. In some examples, virtual reality media content may include objects that are modeled after real-world objects (e.g., virtualized objects based on three-dimensional scans of real-world objects). In other examples, virtual reality media content may include objects that are generated artificially (e.g., and are not based on scans of real-world objects). Certain objects included within virtual reality media content may be discrete objects in accordance with the ordinary usage of the term "object" (i.e., material things that can be seen and touched, etc.). However, it will be understood that the term "objects," as used herein, may also be used to refer to other things presented in the virtual reality media content that may not be commonly referred to as objects in the ordinary usage of the term. For example, an object included within virtual reality media content may be an animate or inanimate object or surface, such as a person or another living thing, a non-transparent solid, liquid, or gas, a less discrete object such as a wall, a ceiling, a floor, or any other type of object described herein or as may serve a particular implementation.

Along with presenting virtual reality media content to the user, content presentation facility 102 may detect one or more characteristics of a real-world environment that surrounds the user as the virtual reality media content is presented to the user. For example, as will be described in more detail below, content presentation facility 102 (e.g., a media player device 200 implementing or included within content presentation facility 102) may detect various characteristics based on data captured by physical sensors and/or data accessed from storage facility 106 or from another system. Management facility 102 may additionally or alternatively perform various other operations as may serve a particular implementation.

Object management facility 104 may include one or more physical computing devices (e.g., hardware and/or software components separate from those of content presentation facility 102) that perform various operations associated with managing objects included with virtual reality media content (e.g., including proxy objects corresponding to real-world objects included in a real-world environment of a user). To this end, object management facility 104 may identify, based on one or more of the characteristics of the real-world environment detected by content presentation facility 102, an actionable real-world object included in the real-world environment. Then, in response to the identifying of the actionable real-world object and as the virtual reality media content is presented to the user, object management facility 104 may dynamically integrate a proxy object corresponding to the actionable real-world object with the representations of the plurality of objects included within the virtual reality media content presented to the user. More particularly, object management facility 104 may configure the proxy object (e.g., size and position the proxy object with respect to the other objects represented in the virtual reality media content) so as to facilitate an action by the user with respect to the actionable real-world object as the virtual reality media content is presented to the user. For instance, as described above, the user action facilitated by the proxy object may include avoiding inadvertent contact with the actionable real-world object corresponding to the proxy object, interacting productively with the actionable real-world object, or the like.

As used herein, a "real-world object" may refer to anything, whether living or inanimate, that exists in the real world (e.g., that is present in the real-world environment of the user as the virtual reality media content is presented to the user). As with objects included in virtual reality media content described above, real-world objects referred to herein may include both discrete objects that are traditionally considered objects as well as, more broadly, other animate or inanimate things and surfaces, such as people and other living things, liquids, gases, walls, ceilings, floors, and the like. Accordingly, as used herein, an "actionable" real-world object may refer to any real-world object with respect to which a user may be likely to perform an action (e.g., real-world objects that the user will likely want to avoid bumping into or will likely want to interact with in a particular way) as virtual reality media content is presented to the user and the user moves about within the real-world environment of the user. Conversely, as used herein, a "non-actionable" real-world object may refer to any real-world object with respect to which the user may be unlikely to perform an action (e.g., real-world objects that, due to their nature or location, may not be acted on by the user in any special way but, rather, may be safely ignored by the user) as the virtual reality media content is presented to the user and the user moves about within the real-world environment.

As used herein, "proxy objects" are virtual objects that correspond to (e.g., act as proxy for) actionable real-world objects and that may be represented within (e.g., dynamically integrated into) virtual reality media content along with representations of other objects included in the virtual reality media content (e.g., other objects associated with the immersive virtual reality world that do not correspond to actionable real-world objects). Examples of actionable real-world objects, non-actionable real-world objects, and proxy objects will be described and illustrated below.

Storage facility 106 may store and maintain any data accessed, received, generated, managed, maintained, processed, presented, transmitted, or otherwise used by facilities 102 and 104 in a particular implementation. For example, as shown, storage facility 106 may include library data 108 and/or management data 110 that may be accessed, received, generated, managed, maintained, processed, presented, transmitted, and/or otherwise used in any of the ways described herein. Library data 108 may include data representative of various objects that may be included within virtual reality media content including data representative of proxy objects that may be integrated into the virtual reality media content to correspond to actionable real-world objects in the real-world environment of the user. Library data 108 may further include data that may facilitate system 100 in identifying and recognizing particular real-world objects so as to facilitate a determination that a particular real-world object is an actionable real-world object. Management data 110 may include various other types of data used by facilities 102 and 104 in performing the operations described herein. For example, management data 110 may include instructions (e.g., programming instructions) for performing the operations described herein and/or other data used by facilities 102 and 104 in various implementations.

Figure 3:
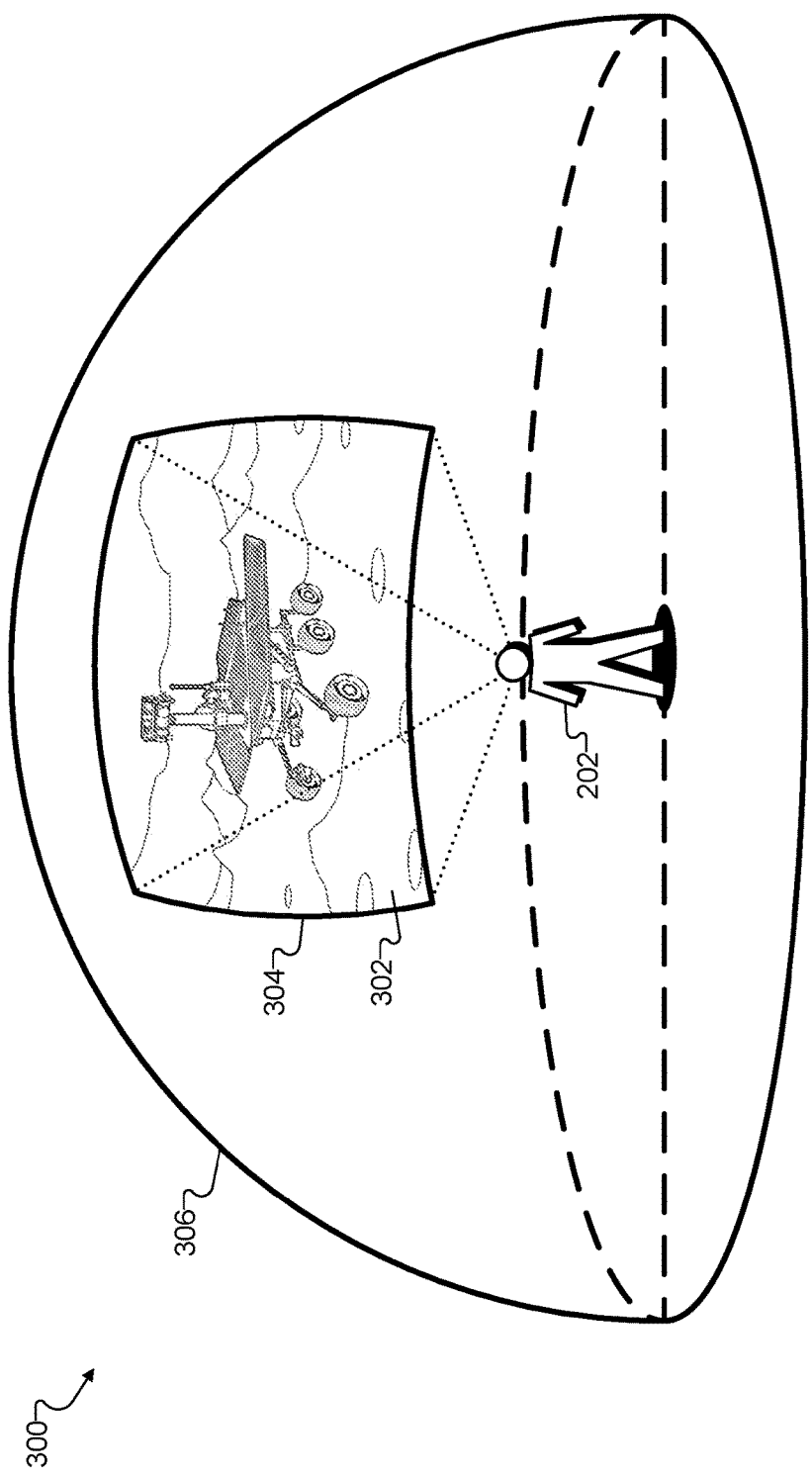
FIG. 3 illustrates an exemplary virtual reality experience in which virtual reality media content is presented to the user by way of a field of view into an exemplary immersive virtual reality world according to principles described herein.

To illustrate how system 100 may present virtual reality media content to user 202 in order to dynamically represent proxy objects corresponding to real-world objects in accordance with examples described herein, FIG. 3 shows an exemplary virtual reality experience 300 in which virtual reality media content 302 is presented to user 202 by way of a field of view 304 of an exemplary immersive virtual reality world 306. Experience 300 depicts an immersive virtual reality experience (e.g., provided by a media player device 200 implementing or included within an implementation of system 100) in which user 202 is fully immersed within immersive virtual reality world 306 so that user 202 can see representations of objects included within virtual reality media content 302 but cannot see real-world objects included in the real-world environment that surrounds user 202 during experience 300. Specifically, as shown, immersive virtual reality world 306 is depicted as a surface of another planet where user 202 may move about and look around to experience objects such as a planetary rover vehicle; craters, mountains, and other formations; stars and other celestial bodies visible in the sky; and so forth.

User 202 may experience virtual reality media content 302 by providing user input to dynamically change field of view 304 to display whatever virtual reality media content 302 that user 202 wishes to view within immersive virtual reality world 306. For example, the user input provided by user 202 may include an indication (e.g., by way of a natural head movement, by moving from one location to another within the real-world environment, etc.) that user 202 wishes to look in a certain direction or move to a new location within immersive virtual reality world 306 to experience virtual reality media content not currently presented within field of view 304. As such, the media player device 200 being used by user 202 to provide experience 300 may be configured to detect the user input and, in response, may gradually replace some virtual reality media content 302 with other virtual reality media content 302 that is determined to be visible from a virtual viewpoint of user 202 within immersive virtual reality world 306 according to the changes effected by the user input.

The elements illustrated in FIG. 3 are exemplary only. For example, it will be understood that, while immersive virtual reality world 306 is illustrated in FIG. 3 as a semi-sphere (e.g., indicating that user 202 may look in any direction that is substantially forward, backward, left, right, and/or up), in certain implementations, immersive virtual reality world 306 may include an entire sphere (e.g., so that user 202 may direct field of view 304 in any direction immersive virtual reality world 306 including down) and/or may be implemented using non-spherical shapes such as cubes, rectangular prisms, pyramids, and/or other geometric structures that may serve a particular implementation.

Figure 4:
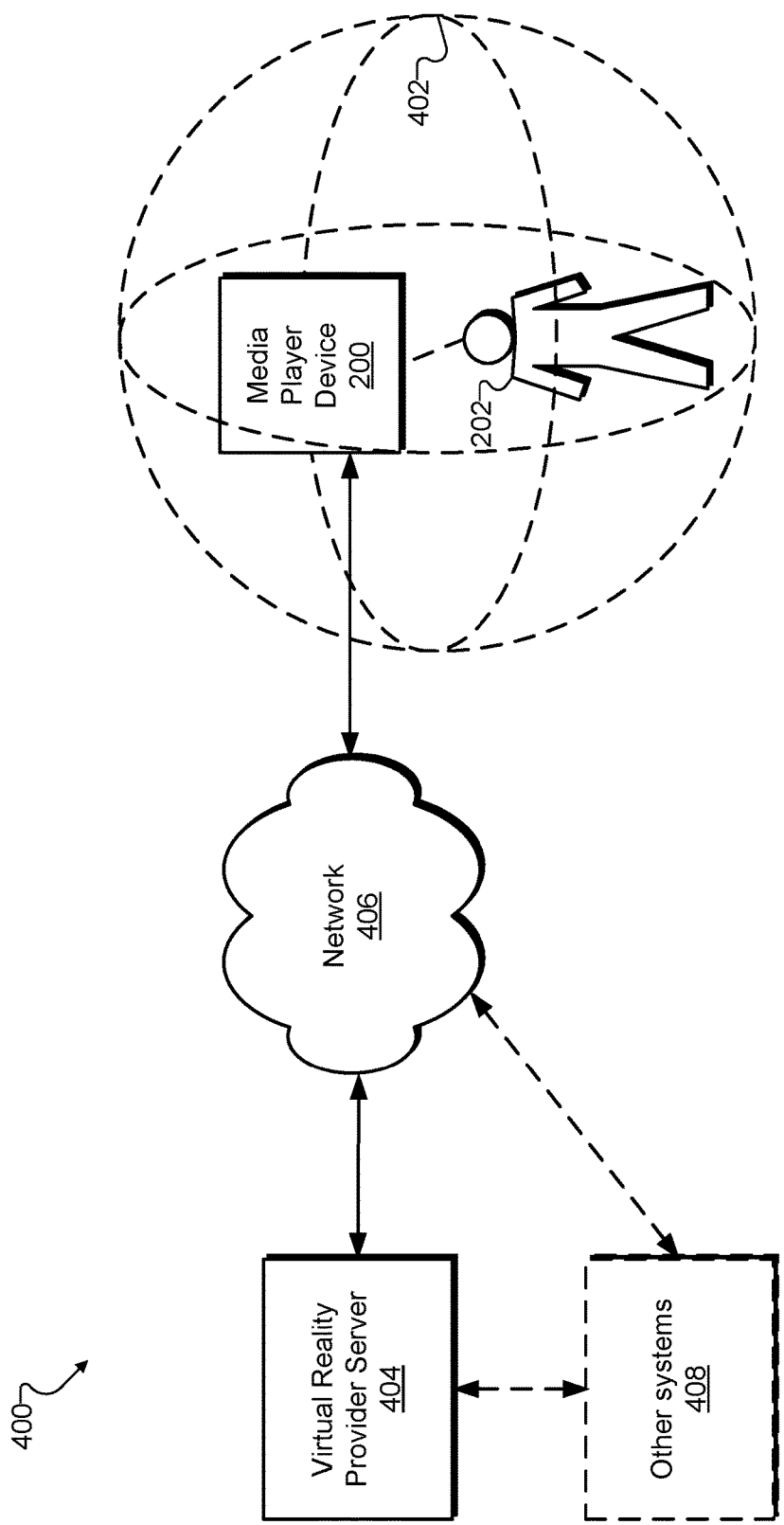
FIG. 4 illustrates an exemplary configuration in which the virtual reality system of FIG. 1 may be implemented to dynamically represent, within virtual reality media content being presented to a user, a proxy object that corresponds to a real-world object included in a real-world environment of the user according to principles described herein.

FIG. 4 illustrates an exemplary configuration 400 in which system 100 may be implemented to dynamically represent, within virtual reality media content being presented to user 202, a proxy object that corresponds to a real-world object included in a real-world environment of user 202. As shown, configuration 400 includes a real-world environment 402 in which user 202 is located as virtual reality media content is presented to user 202 by way of a media player device 200 (e.g., a media player device such as immersive headset device 200-1 or mobile computing device 200-2, as described above). Configuration 400 further includes a virtual reality provider server 404 communicatively coupled to media player device 200 by way of a network 406. In certain implementations, configuration 400 may also include one or more other systems 408 that may be communicatively coupled with virtual reality provider server 404 and/or media player device 200 directly or by way of network 406 as may serve a particular implementation.

System 100 may be implemented by the systems and devices illustrated in configuration 400 in any suitable way. For instance, in certain examples, system 100 may be fully implemented by media player device 200 or may be implemented by media player device 200 along with one or more other client-side system components (not explicitly shown) such as controllers, computing hubs, and/or various accessories that may be available for use with media player device 200. In other examples, system 100 may be implemented by a combination of media player device 200 and one or more server-side system components (e.g., as well as other client-side system components as may serve a particular implementation). For example, certain operations performed by system 100 such as detecting a characteristic of real-world environment 402, identifying actionable real-world objects based on detected characteristics, and/or dynamically integrating representations of proxy objects into virtual reality media content may be performed or facilitated by virtual reality provider server 404 by using data (e.g., library data) maintained by virtual reality provider server 404 and/or other systems 408, by utilizing processing resources included within virtual reality provider server 404, or in another suitable manner.

Accordingly, in operation, system 100 (e.g., media player device 200 implementing or included within system 100) may present virtual reality media content to user 202 as user 202 is located in real-world environment 402. As the virtual reality media content is being presented, system 100 (e.g., media player device 200 implementing or included within system 100, virtual reality provider server 404 included within system 100, etc.) may detect one or more characteristics of real-world environment 402.

The characteristics of real-world environment 402 may be detected in any suitable manner. For instance, the detecting of the characteristics of real-world environment 402 may be performed by way of one or more physical sensors integrated with media player device 200, and may include various types of characteristics that may be detected by various types of physical sensors. One exemplary characteristic that may be detected, for example, is a depth characterization of real-world environment 402 that may be detected by way of a physical depth capture sensor. Physical depth capture sensors such as time-of-flight sensors (e.g., LIDAR sensors, RADAR sensors, Sonic sensors, etc.), proximity sensors, thermal sensors, and so forth may generate depth maps representative of where various points on the surfaces of real-world objects included in real-world environment 402 are located in three-dimensional space with respect to the depth capture sensor. As such, the depth characterization of real-world environment 402 and real-world objects included therein may indicate which objects are present in the vicinity of user 202, how close the objects are to user 202 (e.g., whether they are close enough to pose a risk for user 202 inadvertently bumping into them), and so forth.

Another exemplary characteristic that may be detected is an image characterization of real-world environment 402 detected by way of a physical image capture sensor. Specifically, an image capture sensor such as a camera (e.g., a video camera) may capture an image (e.g., a picture, a video, etc.) of real-world objects included within real-world environment 402. Using such images, image processing techniques may be performed (e.g., by media player device 200, by another client-side computing device, and/or by a server-side system such as virtual reality provider server 404) to identify the real-world objects. Additionally, in certain implementations, the image may be used to help determine the depth characterization (e.g., in conjunction with depth capture sensors or in place of depth capture sensors in implementations where no such sensors are available) because objects nearer to the image capture sensor may reflect light in different ways or amounts than objects farther from the image capture sensor.

Yet another exemplary characteristic that may be detected is a location of real-world environment 402 (e.g., and, by extension, the respective locations of real-world objects included within real-world environment 402), which may be detected by way of a physical location sensor. Specifically, a location sensor such as a GPS sensor (which may be effective for outdoor use), a beacon, such as a BLUETOOTH beacon, (which may be effective for indoor use), a Wi-Fi or cellular interface (which may be used to triangulate or otherwise determine the location indoors or outdoors), or another suitable location sensor may be used to determine location coordinates for media player device 200. The location sensor may employ any technique or methodology as may serve a particular implementation. For example, GPS and BLUETOOTH beacon sensors may employ standardized location determination techniques, cellular interfaces using cellular triangulation may employ an Observed Time Difference of Arrival ("OTDOA") technique, Wi-Fi interfaces may employ a time-of-flight technique to determine proximity with a wireless access point at a known location, and so forth.

Yet another exemplary characteristic that may be detected is an attitude characterization of media player device 200 with respect to real-world environment 402 detected by way of one or more physical attitude sensors. For example, an attitude characterization of media player device 200 may represent a characterization of how media player device 200 is oriented (e.g., which direction an immersive headset device is facing, how a mobile computing device is oriented in space, etc.) as well as directional vectors for the movement of media player device 200 with respect to real-world environment 402 (e.g., whether media player device 200 is stationary, is being carried through real-world environment 402 from one location to another, etc.). To this end, attitude sensors may include motion sensors, directional sensors, orientation sensors, pressure sensors, and/or other suitable sensors that may help determine and track the orientation and motion of media player device 200 as user 200 experiences the virtual reality media content by moving media player device 200 through real-world environment 402.

Along with detecting characteristics of real-world environment 402 by way of physical sensors, the characteristics of real-world environment 402 may also be detected in other ways. For example, system 100 may detect characteristics of real-world environment 402 by accessing predetermined data representative of the characteristics and determined prior to the presenting of the virtual reality media content to user 202. For example, system 100 may access predetermined data representative of a floorplan of a building, a map of a geographical location, an inventory of real-world objects known to be located at a particular place, etc., from media player device 200 (e.g., from storage facility 106), from virtual reality provider server 404, or from other systems 408. As such, system 100 may be able to detect various characteristics without relying on physical sensors at all.

Additionally, system 100 may detect characteristics of real-world environment 402 by both accessing predetermined data and by detecting live data by way of physical sensors. Specifically, for example, the predetermined data representative of the characteristics of the real-world environment may include data representative of one or more of the actionable real-world objects that are known to be part of the real-world environment based on data (e.g., blueprint data, map data, etc.) accessible from a suitable source and/or based on data that was stored during a previous virtual reality presentation by system 100 (e.g., a virtual reality presentation to the user or to a different user). System 100 may also detect, by way of a physical sensor integrated with media player device 200, additional data representative of the one or more actionable real-world objects (e.g., up-to-date data representative of a current state of the actionable real-world objects). System 100 may then perform the identifying of the actionable real-world objects by identifying the actionable real-world objects based on both the predetermined data representative of the actionable real-world object that was stored during the previous virtual reality presentation and the additional data representative of the actionable real-world object detected by way of the physical sensors. Moreover, system 100 may also, as part of the identifying, update the data representative of the actionable real-world object that was stored during the previous virtual reality presentation to include the additional data representative of the actionable real-world object detected by way of the physical sensors (e.g., the up-to-date data).

By utilizing both manners of detecting characteristics of real-world environment 402 together in this way, system 100 may determine a highly accurate characterization of real-world environment 402 without undue processing or latency. Additionally, by storing data detected by physical sensors integrated into media player device 200 for later access and use in this way, system 100 may engage in "self-learning" that enables system 100 to become increasingly effective at dynamically representing proxy objects corresponding to real-world objects and to thus present more engaging, accurate, immersive, and/or customized virtual reality media content to users. Specific examples of characterizations of real-world environment 402 that system 100 may determine or detect will be described in more detail below.

Virtual reality provider server 404 may include one or more servers or other computing devices associated with (e.g., provided and/or managed by) a virtual reality media provider (e.g., a network service provider, a cable service provider, a satellite service provider, an Internet service provider, a provider of virtual reality mobile applications, etc.). As described above, in some examples, virtual reality provider server 404 (or certain components of virtual reality provider server 404) may be included within system 100 and, as such, may perform or facilitate media player device 200 in performing any of the operations described herein as being performed by system 100. In other examples, virtual reality provider server 404 may be separate from and communicatively coupled to system 100, which may be implemented by media player device 200 (e.g., and possibly other client-side system components) and may facilitate system 100 to dynamically represent proxy objects corresponding to real-world objects in any way as may serve a particular implementation.

Virtual reality provider server 404 may operate (alone or in conjunction with other systems 408) to generate or otherwise access virtual reality media content and to provide the virtual reality media content to media player device 200 by way of network 406. Accordingly, virtual reality provider server 404 may store, provide, and/or facilitate creation or modification of virtual reality media content (e.g., virtual reality media content in which proxy objects corresponding to real-world objects are integrated with other objects included within the virtual reality media content). In some examples, virtual reality provider server 404 may store a library of predefined (e.g., provider defined) and/or user-defined real-world objects, proxy objects, or other data associated with representing proxy objects corresponding to real-world objects as described herein. Virtual reality provider server 404 may also facilitate users in selecting, accessing, modifying, creating, interacting with, or otherwise experiencing virtual reality media content (e.g., by way of a user interface presented on media player device 200).

Network 406 may include a provider-specific wired or wireless network or series of networks (e.g., a cable or satellite carrier network, a mobile telephone network, etc.), the Internet, a wide area network, a content delivery network, or any other suitable network. Data may flow between virtual reality provider server 404 and media player device 200 (e.g., as well as between these systems and other systems 408 in certain examples) using any communication technologies, devices, media, and protocols as may serve a particular implementation.

Other systems 408 may include one or more servers or other computing devices other than virtual reality provider server 404 (e.g., systems associated with third party services or platforms) that also facilitate system 100 in performing operations described herein. For example, other systems 408 may determine, detect, maintain, and/or provide data that system 100 (e.g., virtual reality provider server 404 and/or media player device 200) may employ to perform methods described herein. In some implementations, for instance, other systems 408 may provide specific data (e.g., maps, floorplans, etc.) or data services (e.g., cloud storage services, etc.) to facilitate system 100 in detecting characteristics of real-world environment 402, identifying actionable real-world objects, or the like. In the same or other implementations, other systems 408 may include data platforms that receive and maintain data provided by various devices (e.g., Internet of Things ("IoT") devices) and facilitate various systems (e.g., such as system 100) in analyzing and making use of the data.

Figure 5:
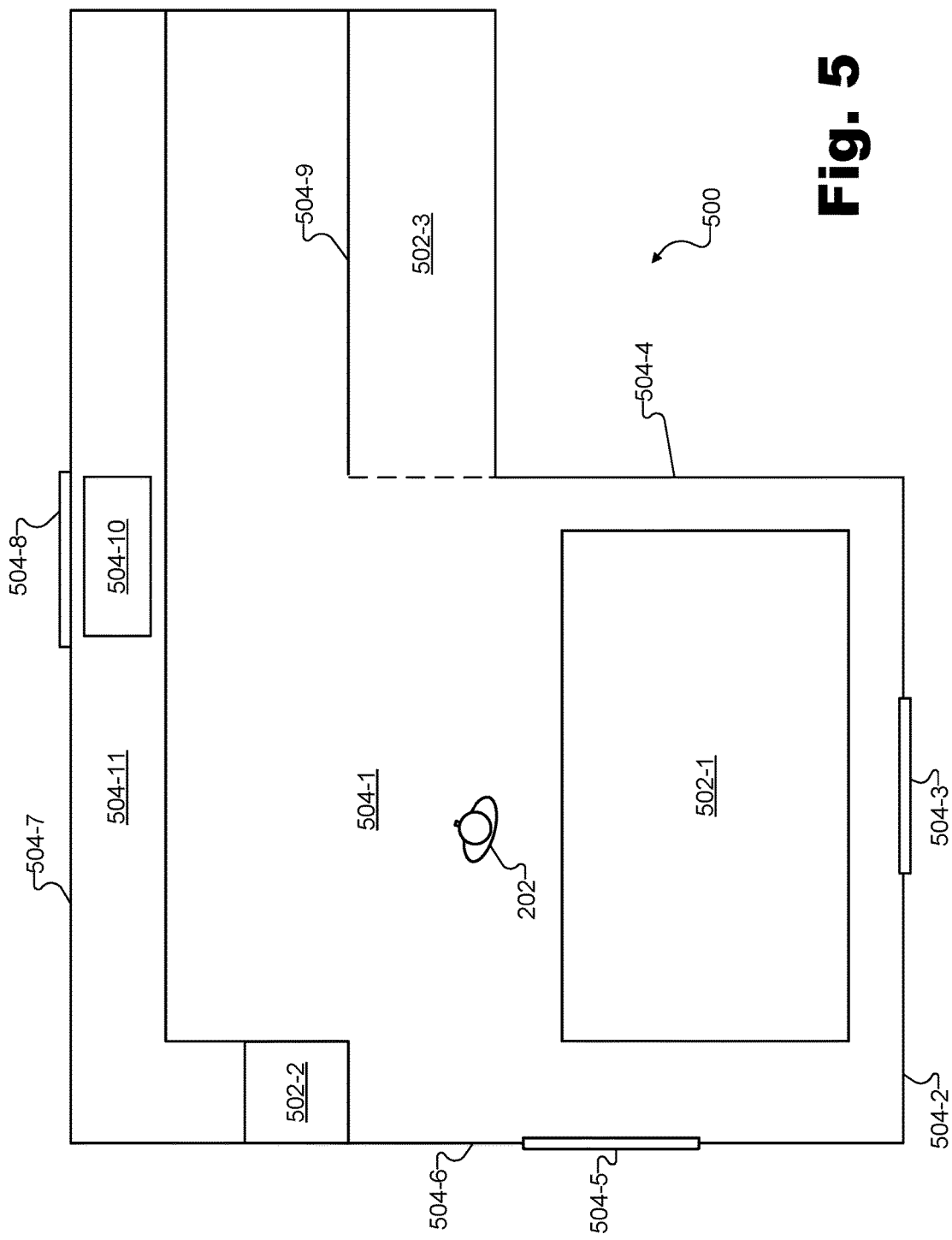
FIG. 5 illustrates an exemplary real-world environment that includes exemplary real-world objects and in which a user is located as virtual reality media content is presented to the user according to principles described herein.
Figure 6:
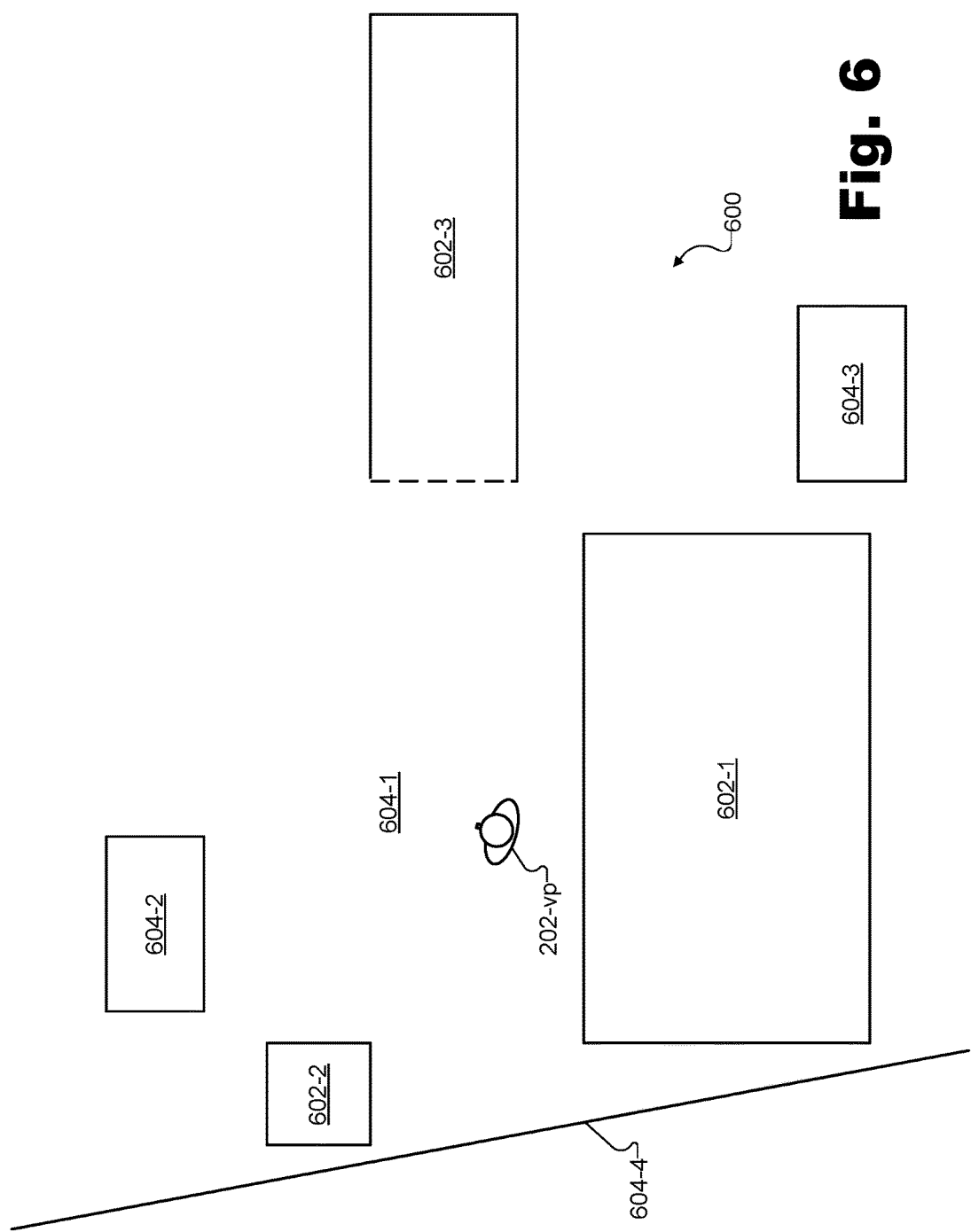
FIG. 6 illustrates an exemplary immersive virtual reality world experienced by the user as virtual reality media content including representations of a plurality of objects is presented to the user located in the real-world environment of FIG. 5 according to principles described herein.
Figure 7:
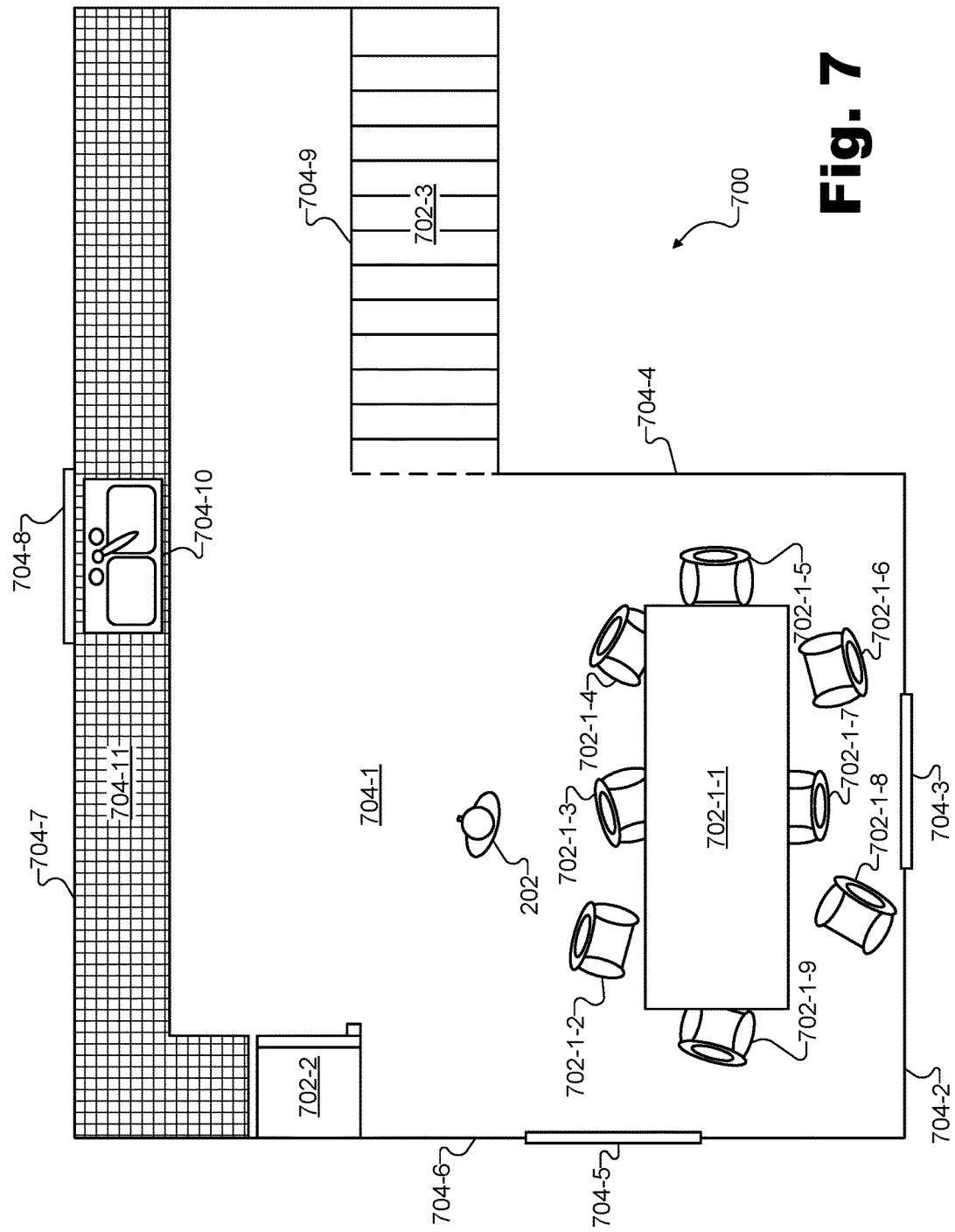
FIG. 7 illustrates a specific implementation of an exemplary real-world environment that includes exemplary real-world objects and in which a user is located as virtual reality media content is presented to the user according to principles described herein.
Figure 8:
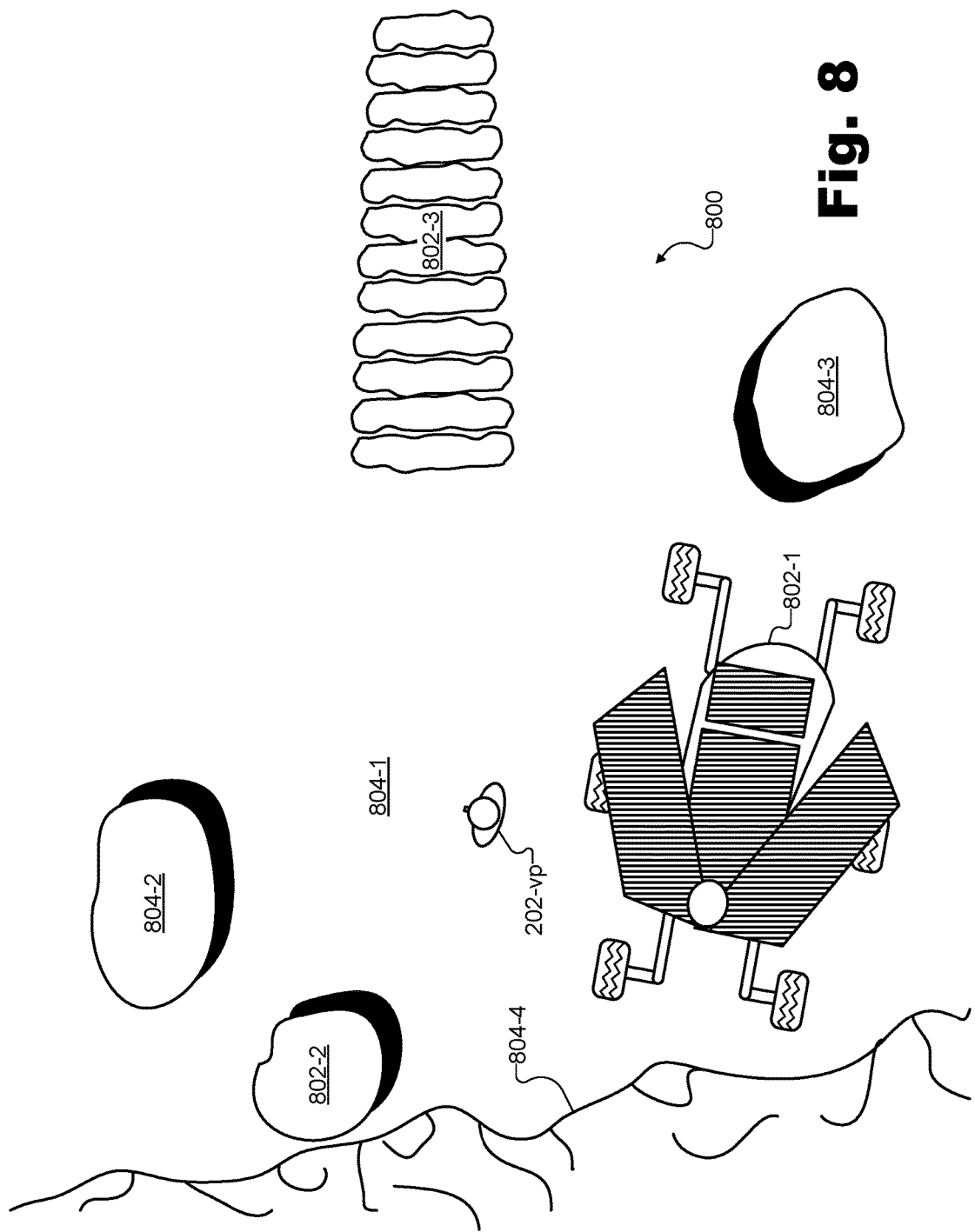
FIGS. 8 and 9 illustrate a specific implementation of an exemplary immersive virtual reality world experienced by the user as virtual reality media content including representations of a plurality of objects is presented to the user located in the real-world environment of FIG. 7 according to principles described herein.
Figure 9:
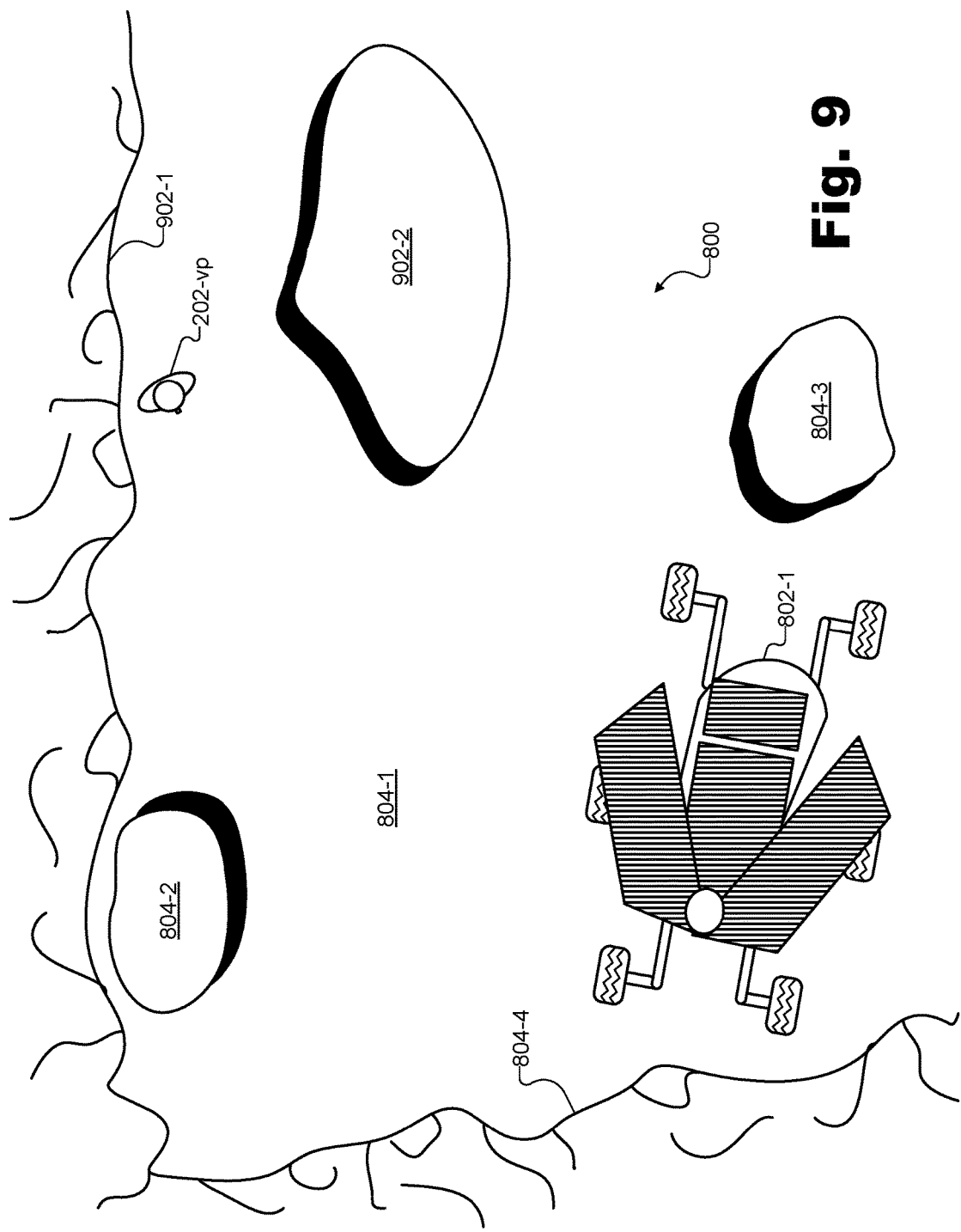

FIGS. 5 through 9 illustrate specific examples of real-world environments (e.g., FIGS. 5 and 7) that may surround user 202 (i.e., in which user 202 may be located) as virtual reality media content associated with exemplary immersive virtual reality worlds (e.g., FIGS. 6, 8, and 9) is presented to user 202 and as system 100 dynamically represents, within the virtual reality media content, proxy objects that correspond to real-world objects included in the real-world environments. In particular, FIGS. 5 and 6 first illustrate a relatively generalized example, then FIGS. 7 through 9 illustrate a relatively specific example. Regardless, it will be understood that the examples illustrated by and described with respect to FIGS. 5 through 9 are for illustration purposes only and are not meant to limit the operations that system 100 may perform in various implementations in any way. Additionally, it will be understood that these examples may involve an implementation of system 100 such as that illustrated in configuration 400 or any other implementation as illustrated in any other configuration as may serve a particular implementation.

FIG. 5 illustrates an exemplary real-world environment 500 that includes exemplary real-world objects and in which user 202 is located as virtual reality media content is presented to user 202. As shown, real-world environment 500 is shown from the perspective of a cutaway top view above user 202. Real-world environment 500 may represent an indoor or an outdoor location and may change as user 202 moves about in the real-world environment (e.g., change from an indoor to an outdoor real-world environment as user 202 walks from an indoor location to an outdoor location, etc.).

As shown, real-world environment 500 may include various real-world objects 502 (i.e., objects 502-1 through 502-3) and 504 (i.e., objects 504-1 through 504-11). As will be described below, objects 502 may be determined to be actionable real-world objects and, as such, may be referred to herein as actionable real-world objects 502 in certain contexts. For example, actionable real-world objects 502 may include those objects that, when identified, system 100 determines to be likely to be acted on by user 202 (e.g., to be avoided by user 202, to be manipulated by user 202, etc.). Object 502-1, for instance, may be a large object (or collection of objects) right behind user 202 that user 202 may want to avoid bumping into as user 202 enjoys his or her virtual reality experience in real-world environment 500. Similarly, object 502-2 may be another object relatively proximate to the current location of user 202 that user 202 may similarly wish to avoid bumping into. For example, in an indoor setting, objects 502-1 and 502-2 could be furniture, low-hanging fixtures, built-in features (e.g., island countertops), people (or groups of people), pets, or the like. In an outdoor setting, objects 502-1 and 502-2 could instead be objects such as trees or shrubs, vehicles, poles in the ground, rocks or small objects that could be tripped over, and so forth.

While object 502-3 may be part of the ground upon which user 202 may walk, object 502-3 may also be determined to be actionable because the ground represented by object 502-3 may be different from the ground that user 202 is currently standing on (i.e., ground object 504-1). For instance, object 502-3 may represent an area that is wet or muddy, that has a different texture (e.g., a more slippery texture) than ground object 504-1, that has a significantly different pitch or slope than ground object 504-1, or the like. As another example, object 502-3 may include stairs that user 202 may wish to avoid.

Additionally or alternatively, certain actionable real-world objects 502 may be objects with which user 202 may desire to interact in a particular way (i.e., rather than to avoid). For example, if object 502-3 is a set of stairs, user 202 may not necessarily need to perform the action of avoiding object 502-3 but, rather, may wish to perform the action of navigating (i.e., walking up or down) the stairs. However, unlike the flat ground upon which user 202 may currently be standing (i.e., ground object 504-1), the stairs of object 502-3 may require that care be taken by user 202 so as to avoid mishap (e.g., tripping over the stairs, falling down the stairs, etc.). As another example, an object 502 may be a doorknob that user 202 may turn to open a door, a controller (e.g., a control console or the like) that user 202 may interact with to control certain aspects of the virtual reality experience, or another real-world object that user 202 may wish to perform an action on. Accordingly, in all of these examples, system 100 may recognize and identify objects 502 as actionable real-world objects that are to be represented by proxy objects within the virtual reality media content to facilitate the appropriate actions by the user with respect to the actionable real-world objects during the virtual reality experience.

Conversely, objects 504 may be determined to be non-actionable real-world objects and thus may be referred to herein as non-actionable real-world objects 504 in certain contexts. For example, non-actionable real-world objects 504 may include those objects that are not yet identified by system 100 (e.g., due to being hidden by other objects, being too far away from user 202 for system 100 to detect the characteristics of, etc.), or that, when identified, are determined to be unlikely to be acted on by user 202 (e.g., avoided, manipulated, etc.). As mentioned above, an "action," as the term is used herein, is performed by a user with respect to a real-world object when an interaction of the user with the object is significantly facilitated by the user being able to see or be otherwise specifically cognizant of the real-world object while performing the interaction. Thus, as described above, if object 504-1 is the ground upon which user 202 is currently standing, object 504-1 may be determined to be a non-actionable real-world object because user 202 may reasonably continue to stand or walk upon ground object 504-1 without being able to see or otherwise be specifically cognizant of the ground object. In contrast, user 202 may reasonably need to see or be otherwise cognizant of objects such as stairways or mud to avoid risk of mishap.

Other non-actionable real-world objects 504 may be objects that user 202 may not necessarily care to perform an action on (e.g., avoid or manipulate) because they do not pose a significant risk of mishap (e.g., a slight incline on the ground, fallen leaves that can be stepped on, overhead objects that are out of reach such as a ceiling or a room or a bird in the sky, etc.). Still other real-world objects may be determined to be non-actionable because of their relatively large proximity from user 202. For example, in real-world environment 500, various objects 504 (i.e., objects 504-2 through 504-9) are walls or windows that may be determined to be actionable but for the fact that the walls and windows are currently too far away from user 202 to be of immediate concern. Similarly, depending on the characteristics of objects 504-10 and 504-11 that are detected, objects 504-10 and 504-11 may later be determined to be actionable (e.g., if user 202 moves so as to be more proximate to the objects) but may currently be far enough away to be deemed non-actionable.

Once real-world objects have been identified (e.g., detected, analyzed, and determined to be either actionable or non-actionable), representations of proxy objects corresponding to actionable real-world objects may be dynamically integrated with other objects included within virtual reality media content being presented to user 202. To illustrate, FIG. 6 shows an exemplary immersive virtual reality world 600 experienced by user 202 as virtual reality media content including representations of a plurality of objects is presented to user 202 as user 202 is located in real-world environment 500. As shown, FIG. 6 includes a virtual viewpoint 202-vp representative of a virtual viewpoint of user 202 within immersive virtual reality world 600. For example, virtual viewpoint 202-vp may be associated with a virtual avatar used by user 202 or may simply represent a current perspective of user 202 within immersive virtual reality world 600. Because of the close association between user 202 and virtual viewpoint 202-vp, user 202 may be referred to herein as moving within immersive virtual reality world 600 from one location to another when, strictly speaking, it is actually virtual viewpoint 202-vp of user 202 that is virtually moving from one location to another within immersive virtual reality world 600.

As further shown in FIG. 6, immersive virtual reality world 600 may include representations of a plurality of objects 602 (e.g., objects 602-1 through 602-3) and 604 (e.g., objects 604-1 through 604-4). As with real-world objects 502 and 504 described above with respect to real-world environment 500, virtual objects 602 and 604 may form two distinct groups. In this case, objects 602 may each correspond to respective actionable real-world objects 502 and may thus be included in the virtual reality media content as proxy objects to facilitate appropriate actions by user 202 with respect to the respective actionable real-world objects 502. Accordingly, objects 602 may be referred to as proxy objects 602 and may be represented by any virtual objects that are integrated into immersive virtual reality world 600 and that are configured (e.g., positioned, sized, etc.) to facilitate appropriate actions by user 202 as described above.

Proxy objects 602 may be selected as any objects as may serve a particular implementation. For instance, in some examples, the dynamic integration of a particular proxy object 602 by system 100 may include selecting, as the proxy object 602 corresponding to the actionable real-world object 502, a virtualized representation of the actionable real-world object 502. Such a selection may be appropriate, for example, in a situation where user 202 may wish to experience, within immersive virtual reality world 600, the particular real-world object 502 as the object appears in real-world environment 500. As one example, user 202 may indicate a preference to system 100 to include a proxy object 602 corresponding to his or her pet dog where the proxy object is a virtualized representation of the dog (i.e., a virtual dog that looks similar to the dog of user 202). In other examples, system 100 may assign proxy objects 602 to correspond to virtualized representations of actionable real-world objects for objects that may be manipulated (e.g., doorknobs, controllers, etc.), that exist to provide safety for user 202 (e.g., exit signs, stoplights, etc.), or that have other characteristics making it important for user 202 to observe the objects as they appear in the real-world environment.

Conversely, in other examples, the dynamic integration of a particular proxy object 602 by system 100 may include selecting, as the proxy object 602 corresponding to the actionable real-world object 502, a virtual object selected from a library of virtual objects associated with a theme of the virtual reality media content. If there is no particular reason to make the proxy object 602 appear as a virtualized representation of the actionable real-world object 502, it may be preferable (e.g., to increase the immersiveness of the virtual reality media content) to select a proxy object 602 that fits with a theme (e.g., a look and feel) of immersive virtual reality world 600. Accordingly, system 100 may select the proxy object 602 from a library of objects that fit with the theme of immersive virtual reality world 600 and integrate the themed object into immersive virtual reality world 600 with other objects included within the immersive virtual reality world. Examples of themed proxy objects will be described and illustrated below.

As shown, proxy objects 602 may be configured to facilitate an action by user 202 with respect to the respective actionable real-world objects 502 that the proxy objects correspond to. For example, proxy object 602-1 is positioned and sized so as to be behind virtual viewpoint 202-vp in immersive virtual reality world 600 so that, even if user 202 turns around and wishes to move in that direction, user 202 will see and be able to avoid bumping into actionable real-world object 502-1 in real-world environment 500 by avoiding proxy object 602-1 in immersive virtual reality world 600. The other proxy objects 602 are similarly configured to facilitate respective actions by user 202.

Along with proxy objects 602, immersive virtual reality world 600 may also include objects 604, which may not correspond to any real-world objects but, rather, may be objects included within the virtual reality media content as part of immersive virtual reality world 600. For example, as shown, a ground object 604-1 may be included within immersive virtual reality world 600 that happens to line up with (i.e., be located in a corresponding place as) ground object 504-1, even though ground object 504-1 may be determined to be non-actionable. Objects 604-2, 604-3, and 604-4 may similarly be objects included within immersive virtual reality world 600 that do not correspond to real-world objects in real-world environment 500 (or that only correspond coincidentally).

While FIGS. 5 and 6 have illustrated a generalized example of dynamically representing proxy objects corresponding to real-world objects in real-world environments, FIGS. 7 through 9 will illustrate additional details and particular points associated with disclosed methods and systems by way of a more concrete example that illustrates specific real-world objects in the real-world environment and specific objects (e.g., including proxy objects corresponding to the real-world objects determined to be actionable) included in the virtual reality media content.

FIG. 7 illustrates a specific implementation of a real-world environment 700 that includes exemplary real-world objects and in which user 202 is located as virtual reality media content is presented to user 202. Similar to real-world environment 500, real-world environment 700 includes a plurality of actionable real-world objects 702 (e.g., actionable real-world objects 702-1-1 through 702-1-9, which may be collectively referred to as actionable real-world objects 702-1, as well as actionable real-world objects 702-2 and 702-3). Real-world environment 700 further includes a plurality of non-actionable real-world objects 704 (e.g., non-actionable real-world objects 704-1 through 704-11). As shown, objects 702 and 704 may roughly correspond to objects 502 and 504 shown in FIG. 5, respectively. However, while objects 502 and 504 described above were described generically, objects 702 and 704 illustrate specific examples of objects within a particular domestic indoor setting.

In real-world environment 700, each of objects 702-1 may be included in a group of objects that system 100 may analyze and treat collectively as a single object. Specifically, as shown, object 702-1-1 may be a table (e.g., a dining table in a dining room of a house) while objects 702-1-2 through 702-1-9 may be chairs associated with the table (e.g., dining chairs set around the table as shown). Upon detecting characteristics of real-world environment 700 and detecting characteristics of objects 702-1 more particularly, system 100 may determine that objects 702-1 are near enough to user 202 to be actionable real-world objects (i.e., objects that user 202 may inadvertently bump into if care is not taken), and are near enough to one another to be treated as a single object (e.g., to be represented in the virtual reality media content by a single proxy object rather than by a plurality of separate proxy objects). Moreover, real-world environment 700 may include a refrigerator object 702-2 and a downward-facing stairway object 702-3, both of which may be proximate enough to user 202 to be identified as actionable real-world objects.

Real-world environment 700 may further include non-actionable real-world objects 704 that are determined to be unlikely to be acted on (e.g., avoided, manipulated, etc.) by user 202 from the present location of user 202. For example, user 202 may easily stand or walk upon a floor object 704-1 without performing any action that would be especially facilitated if user 202 could see the floor or a proxy object representing the floor. Likewise, wall objects 704-2, 704-4, 704-6, 704-7, and 704-9; window objects 704-3, 704-5, and 704-8; a kitchen sink object 704-10; and a kitchen countertop object 704-11 may each be determined to be far enough away from user 202 to be unlikely to be acted on by user 202. As such, all of these objects 704 may similarly be determined to be non-actionable real-world objects, at least for the time being (as will be described below, the actionable status of certain real-world objects may change as user 202 moves about in real-world environment 700).

As described above with respect to other real-world environments, system 100 may detect characteristics of real-world environment 700 based on data detected by one or more physical sensors integrated with a media player device presenting the virtual reality media content to user 202, based on predetermined data accessed from a storage facility of system 100 (e.g., storage facility 106) or from another system, or based on a combination of sensor data and predetermined data. Based on the detected characteristics, system 100 may identify real-world objects and determine whether each real-world object included within real-world environment 700 is actionable or unactionable. For example, as part of the identifying of an actionable real-world object, system 100 may access a library (e.g., a library maintained within system 100 or another system communicatively coupled to system 100) that includes data representative of a plurality of known real-world objects and may identify the actionable real-world object based on the data representative of the plurality of known real-world objects.

In certain implementations, system 100 may detect characteristics, identify real-world objects, and otherwise analyze real-world environment 700 in an efficient and accurate manner by using self-learning, artificial intelligence, data sharing with object recognition data platforms, and/or other processing techniques and methodologies. Such techniques may reduce a processing burden of system 100, for example, by facilitating system 100 in recognizing particular real-world objects that have been successfully recognized previously (e.g., objects that are located in a same location that the objects have been located during one or more previous presentations of virtual reality media content to the user or to other users), distinguishing particular real-world objects from other objects, and so forth.

For example, if system 100 has presented virtual reality media content to user 202 in real-world environment 700 multiple times (e.g., because real-world environment 700 is included in the home of user 202), self-learning techniques, artificial intelligence techniques, and the like may help system 100 to efficiently recognize real-world objects such as refrigerator object 702-2, countertop object 704-11, stairway object 702-3, etc., as these objects may not have changed (e.g., either in location, orientation, or in any other significant way) since the previous presentations of virtual reality media content. Even for real-world objects such as table object 702-1-1 and chair objects 702-1-2 through 702-1-9, which may be slightly changed (e.g., moved, differently oriented, etc.), system 100 may identify these objects more efficiently after several virtual reality presentations than during a first virtual reality presentation by using self-learning, artificial intelligence, and other techniques and methodologies described herein.

Regardless of whether predetermined data is accessed and/or self-learning and artificial intelligence techniques are employed, system 100 may still employ physical sensors integrated within a media player device to detect characteristics of real-world environment 700 and objects 702 and 704 included within real-world environment 700 so as to, for instance, validate the predetermined data (e.g., ensure that objects have not moved from positions where they have been previously, etc.) and detect changes (e.g., determine if new objects are present, if objects have been moved or reoriented, etc.). For example, if objects 702-1 have been moved or reoriented since a previous presentation of virtual reality media content (e.g., to user 202 or to a different user), system 100 may detect these changes by way of physical sensors integrated with the media player device used by user 202.

Once objects have been detected, identified, and determined to be actionable, system 100 may select proxy objects to be integrated into the virtual reality media content to correspond to the identified actionable real-world objects. The selection may be performed in any suitable manner. For example, the selection of proxy objects may also involve self-learning, artificial intelligence, and other such techniques and methodologies to cater to user preferences (e.g., to select proxy objects or types of proxy objects favored by a particular user), to provide consistency between different presentations of virtual reality media content (e.g., to select the same proxy objects to correspond to the same actionable real-world objects as have been selected for previous presentations of virtual reality media content), and so forth.

In certain implementations, for instance, system 100 may implement self-learning, artificial intelligence, or the like, based on an initial sampling of explicit behaviors that system 100 detects user 202 to engage in. For example, if user 202 consistently selects a particular proxy object or sustains an experience with a particular selection or option for a particular duration of time, system 100 may "learn" that the user has a preference for these particular selections or options (e.g., for the particular proxy object). Based on this learning, system 100 may, in the future, be prepared to automatically suggest or insert particular proxy objects preferred by user 202, or to otherwise implement user-preferred selections and options for the virtual reality experience. Such preferences may be suggested and/or automatically implemented permanently or for a limited duration based on any of various aspects of the user experience as may serve a particular implementation. For example, the duration may be determined according to a velocity of a media player device included within or implementing system 100 with respect to a previously detected (e.g., the last detected) location of the media player device, an orientation of the media player device with respect to a previously detected (e.g., the last detected) orientation of the media player device, by other actions detected to be performed by the user with respect to the media player device, or by any other suitable aspect of the virtual reality experience of user 202.

Accordingly, in some examples, selected proxy objects (e.g., proxy objects that have been determined to be preferred by user 202) may be consistent from virtual reality presentation to virtual reality presentation. For instance, as mentioned above, a same proxy object may be selected to correspond to a same actionable real-world object each time user 202 is presented with similar virtual reality media content while located in a same real-world environment. As another example, in certain implementations, proxy objects may even be altered from virtual reality experience to virtual reality experience to give user 202 a sense of continuity with respect to the proxy objects. For instance, if a selected proxy object is an animal, the animal may grow and develop from virtual reality experience to virtual reality experience. As another example, if the proxy object is a painted object represented in an immersive virtual reality world characterized by harsh weather, paint on the proxy object may appear to chip or receive scratches and the like from virtual reality experience to virtual reality experience. Consistency and continuity between presentations of virtual reality media content may be implemented in these types of ways or in any other way as may serve a particular implementation.

Once proxy objects have been selected, the selected proxy objects may be dynamically integrated with other objects included within the virtual reality media content that is presented to user 202. As described above, this dynamic integration may include configuring the proxy object to facilitate an action by user 202 with respect to the actionable real-world object. System 100 may dynamically integrate the proxy object with the representations of a plurality of other objects included within the virtual reality media content presented to the user in any suitable manner.

For example, system 100 may determine a location (e.g., within an immersive virtual reality world associated with the virtual reality media content presented to the user) for a representation of the proxy object to be located within the immersive virtual reality world where the proxy object will facilitate the action by the user with respect to the actionable real-world object as the virtual reality media content is presented to the user. System 100 may also determine a relative size (e.g., with respect to the representations of the plurality of objects included within the virtual reality media content) for the representation of the proxy object to be sized within the immersive virtual reality world in order to facilitate the action by the user. System 100 may then integrate the representation of the proxy object into the immersive virtual reality world at the determined location within the immersive virtual reality world and sized at the relative size with respect to the representations of the plurality of objects.

In certain examples, system 100 may integrate the representation of the proxy object in accordance with a methodology set forth by the following pseudocode:

```
RUN Short Range Object/Image Recognition for Duration of VR FEED
  If Object is detected then
    Isolate Coordinates of Object (a,b,c)
    Calibrate Object Dimensions (x,y,z)
    STORE ObjectArray(x)
    if ObjectArray(x) != PreviousObjectFound
      LookUpVRLibrary(x,y,z) SET TO 3DImage Object
      Resize for VR Experience (3DImageObject)
      Insert to VR Feed SET TO (a,b,c)
    else if ObjectArray(x) != NotPresentatCoordinates(a,b,c)
      Remove from VR feed
    else if ObjectArray(x) != Dimension(x,y,z)
      Resize for VR Experience(3DImageObject)
      Insert to VR Feed SET TO (a,b,c)
  End If
```

Specifically, as shown in the pseudocode, system 100 may run a short range object/image recognition process throughout a duration of a virtual reality feed (e.g., a virtual reality session). For example, in this process, certain modes of detecting the real-world environment may be used to detect objects at a relatively short range. In other examples, other processes may be run throughout the virtual reality feed that may use other modes of detecting the real-world environment (e.g., different types of sensors, etc.) so as to detect objects at different ranges for other situations or locations (e.g., an indoor and outdoor location). Regardless of which process is used throughout the virtual reality feed, system 100 may perform the following operations when a real-world object or other real-world limit is detected within the real-world environment (i.e., "if Object is detected then").

First, system 100 may isolate coordinates of the real-world object within the real-world environment and calibrate dimensions of the real-world object. This isolation and calibration of coordinates and dimensions will be used to help integrate a proxy object appropriately to stand in for the detected real-world object in the virtual reality media content. Next, system 100 may store an entry representative of the real-world object (e.g., including the isolated coordinates and/or calibrated dimensions, an image of the real-world object, and/or other suitable data related to the real-world object) in an array of known real-world objects. In this way, system 100 may begin to "self-learn" and/or otherwise facilitate improving from virtual reality presentation to virtual reality presentation by storing and recalling information from previous presentations.

System 100 may then integrate the real-world object into the virtual reality media content based on what the real-world object is and whether the real-world object has been used before. Specifically, if the real-world object is determined to be a new, unrecognized object for a particular location in the real-world environment (i.e., "if Object Array(x) !=Previous Object Found), system 100 may identify the real-world object by looking up the object in a virtual reality library. System 100 may then resize a proxy object based on proximity of the user to the real-world object and insert the proxy object into the virtual reality feed. Conversely, if the real-world object is expected to be located at the particular location in the real-world environment but is not detected to presently be present (i.e., "else if ObjectArray(x) !=Not Present at Coordinates (a,b,c)"), system 100 may remove the proxy object from the virtual reality feed because the proxy object no longer corresponds to a real-world object. If the real-world object is present in the real-world environment and recognized by system 100 but is in a new location with respect to the user due to movement of either or both of the user and the real-world object (i.e., "else if ObjectArray(x) !=Dimension(x,y,z)), system 100 may continue to use the same proxy object that has corresponded to the real-world object throughout the duration of the virtual reality feed, but may resize the proxy object appropriately to reflect the movement of the user and/or the real-world object prior to inserting (e.g., reinserting) the proxy object into the virtual reality feed.

To illustrate the dynamic integration of proxy objects with the other objects included within the virtual reality media content, FIG. 8 illustrates a specific implementation of an exemplary immersive virtual reality world 800 experienced by user 202 as virtual reality media content including representations of a plurality of objects is presented to user 202 as user 202 is located in real-world environment 700. As shown, a plurality of proxy objects 802 (i.e., proxy objects 802-1 through 802-3) corresponding to respective actionable real-world objects (or groups of objects) are integrated together with a plurality of objects 804 (i.e., other objects included within the virtual reality media content that do not act as proxy for particular real-world objects) within the virtual reality media content associated with immersive virtual reality world 800. Specifically, a planetary rover proxy object 802-1 may be integrated with the virtual reality media content to correspond to the group of real-world objects 702-1 (i.e., the table and chair objects), a boulder proxy object 802-2 may be integrated to correspond to the refrigerator real-world object 702-2, and a rocky stairway proxy object 802-3 (e.g., a themed stairway that appears to be carved out of the rocky terrain of immersive virtual reality world 800) may be integrated to correspond to the stairway real-world object 702-3. As shown, these proxy objects 802 are integrated with non-proxy objects 804 (i.e., objects included within the virtual reality media content that do not specifically correspond to actionable real-world objects) including a ground object 804-1, another boulder object 804-2, a crater object 804-3, and a cliff drop-off object 804-4.

Each of objects 802 and 804 may be included within a library that is accessible to system 100 and includes virtual objects that fit with a theme (e.g., an exoplanetary theme) of immersive virtual reality world 800. In some examples, proxy objects 802 may be indistinguishable from other objects 804 by user 202. In other examples, system 100 may present virtual reality media content to user 202 in a way that allows user 202 to distinguish some or all of proxy objects 802 (on which user 202 may desire to perform an action) from objects 804 (which may be virtual only and may not correspond to real-world objects on which user 202 may perform an action).

In some examples, system 100 may access data representative of user input provided by the user during a previous virtual reality presentation to the user by the virtual reality presentation system and may determine, based on the data, a preference of user 202 with respect to a particular real-world object. For example, user 202 may have indicated an interest in or a preference for planetary rover object 802-1 in one or more previous presentations of virtual reality media content in which planetary rover object 802-1 was selected as a proxy object for table and chair objects 702-1. For example, user 202 may have spent time examining planetary rover object 802-1 from various angles in a way that user 202 has not examined other proxy objects 802, such that system 100 determines that user 202 prefers planetary rover object 802-1. Rather than determining the user preference automatically in this way, in other examples, system 100 may also determine user preferences based on explicit input from user 202 (e.g., by way of a user interface allowing user 202 to explicitly select preferred proxy objects and/or to assign particular proxy objects to correspond to particular real-world objects).

Accordingly, in response to an identification of actionable real-world objects 702-1 and based on the determined preference of user 202 for planetary rover object 802-1, system 100 may select planetary rover object 802-1 as a user-customized proxy object corresponding to the group of actionable real-world objects 702. In response to the selection and as the virtual reality media content is presented to user 202, system 100 may dynamically integrate a representation of the user-customized proxy object (i.e., planetary rover object 802-1) with the representations of the plurality of other objects 802 and 804 included within the virtual reality media content presented to user 202. Specifically, as with other proxy objects, system 100 may configure planetary rover object 802-1 to facilitate an action by the user with respect to actionable real-world objects 702-1 (e.g., avoiding bumping into the table and/or chairs) as the virtual reality media content is presented to the user 202.

In certain examples, user 202 may move about within real-world environment 700 to cause virtual viewpoint 202-vp to correspondingly move about in immersive virtual reality world 800. As mentioned above, as such movement occurs, the actionable status of the real-world objects (i.e., whether the objects are determined to be actionable real-world objects or non-actionable real-world objects) may be dynamically reassessed such that non-actionable real-world objects may be determined to become actionable real-world objects and vice versa. Thus, as new actionable real-world objects are identified (e.g., as real-world objects come into the vicinity of user 202) and/or as previously actionable real-world objects lose their actionable status (e.g., as real-world objects get far enough away from user 202 to become unlikely to be acted on), proxy objects may be dynamically selected and integrated into immersive virtual reality world 800. For example, objects may suddenly or gradually appear (e.g., grow from the ground, materialize, drop from the sky, etc.) or may suddenly or gradually change or disappear, as may be appropriate. In other examples, proxy objects may be integrated permanently into immersive virtual reality world 800 so that the objects do not appear or disappear based on the movement of user 202, but remain continuously within immersive virtual reality world 800 regardless of whether they are likely to be acted on by user 202.

To illustrate, FIG. 9 shows certain dynamic changes to objects included within immersive virtual reality world 800 that may be implemented by system 100 when user 202 (i.e., virtual viewpoint 202-*vp*) moves to a different location in immersive virtual reality world 800. For example, as shown, because stairway object 702-3 may not be navigated from the new location of user 202 in real-world environment 700 (e.g., because the stairway is entered from around the corner) and because refrigerator object 702-2 is now relatively far away from user 202, system 100 may determine that the only action that a user may be likely to perform with respect to the real-world objects in real-world environment 700 is avoiding countertop object 704-11 and wall object 704-9. Accordingly, countertop object 704-11 and wall object 704-9 may each be determined to become actionable real-world objects for which respective proxy objects 902 (e.g., a rocky wall object 902-1 and a crater object 902-2, respectively) are selected and dynamically integrated into immersive virtual reality world 800.

As shown, stairway object 802-3 may be replaced by crater object 902-2, while boulder object 802-2 may be dynamically removed from immersive virtual reality world 800 altogether because refrigerator object 702-2 may now be determined to be non-actionable. Conversely, planetary rover object 802-1 may remain integrated into immersive virtual reality world 800 (e.g., because of the user preference for planetary rover object 802-1 or for other suitable reasons) despite that the real-world objects corresponding to planetary rover 802-1 (i.e., table and chair objects 702-1) may be determined to now be non-actionable.

Figure 10:
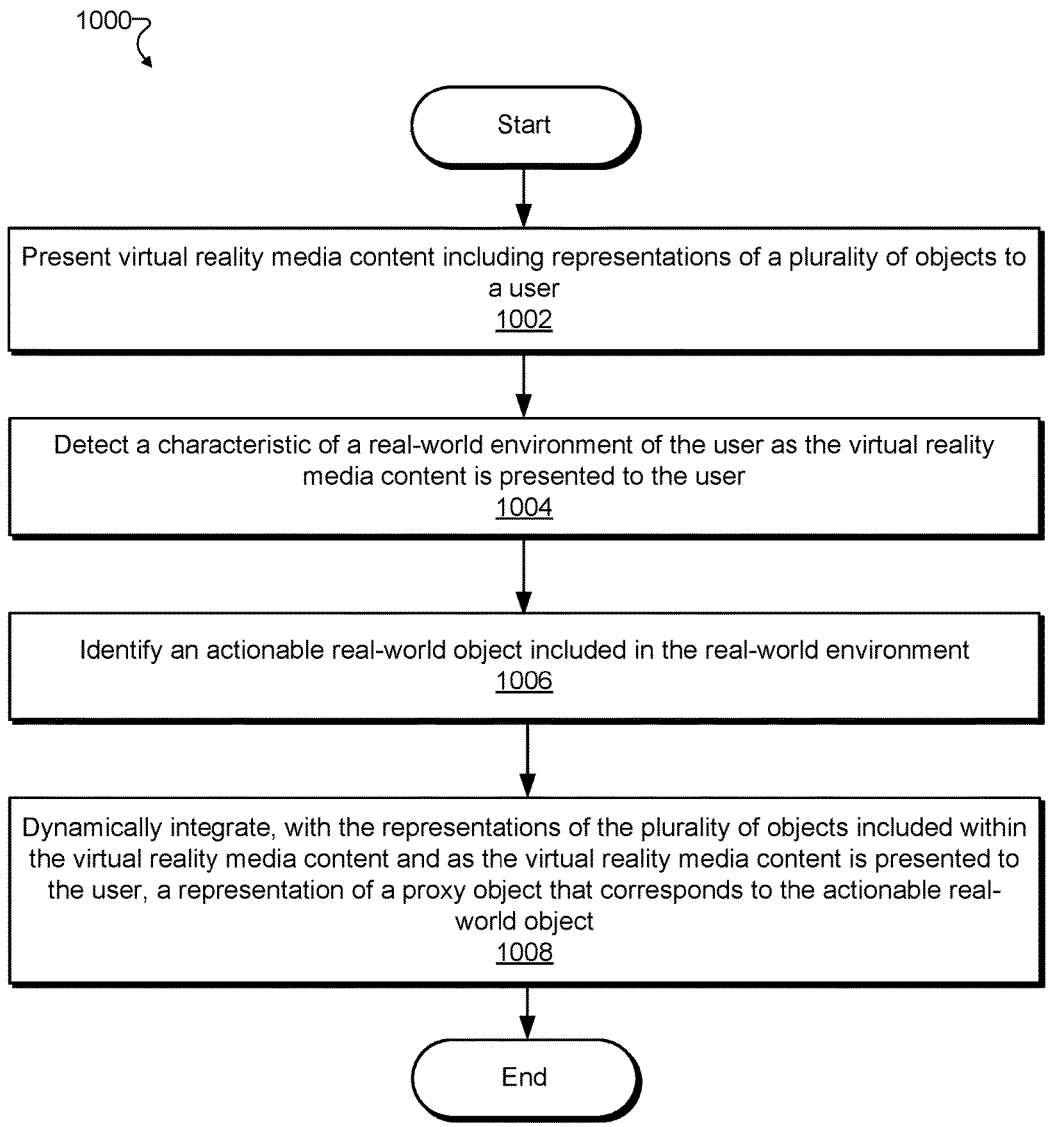
FIGS. 10 and 11 illustrate exemplary methods for dynamically representing, within virtual reality media content being presented to a user, a proxy object that corresponds to a real-world object included in a real-world environment of the user according to principles described herein.

FIG. 10 illustrates an exemplary method 1000 for dynamically representing, within virtual reality media content being presented to a user, a proxy object that corresponds to a real-world object included in a real-world environment of the user. While FIG. 10 illustrates exemplary operations according to one embodiment, other embodiments may omit, add to, reorder, and/or modify any of the operations shown in FIG. 10. One or more of the operations shown in FIG. 10 may be performed by system 100 and/or any implementation thereof.

In operation 1002, a virtual reality system may present virtual reality media content to a user of the virtual reality system. The virtual reality system may include representations of a plurality of objects. Operation 1002 may be performed in any of the ways described herein.

In operation 1004, the virtual reality system may detect a characteristic of a real-world environment of the user as the virtual reality media content is presented to the user. Operation 1004 may be performed in any of the ways described herein.

In operation 1006, the virtual reality system may identify an actionable real-world object included in the real-world environment. For instance, in some examples, the virtual reality system may identify the actionable real-world object based on the characteristic of the real-world environment detected in operation 1004. Operation 1006 may be performed in any of the ways described herein.

In operation 1008, the virtual reality system may dynamically integrate a proxy object corresponding to the actionable real-world object identified in operation 1006 with the representations of the plurality of objects included within the virtual reality media content presented to the user in operation 1002. Operation 1008 may be performed in response to the identifying of the actionable real-world object in operation 1006 and may be performed as the virtual reality media content is presented to the user (e.g., as operation 1002 is ongoing). In some examples, the integrated proxy object may be configured to facilitate an action by the user with respect to the actionable real-world object as the virtual reality media content is presented to the user. Operation 1008 may be performed in any of the ways described herein.

Figure 11:
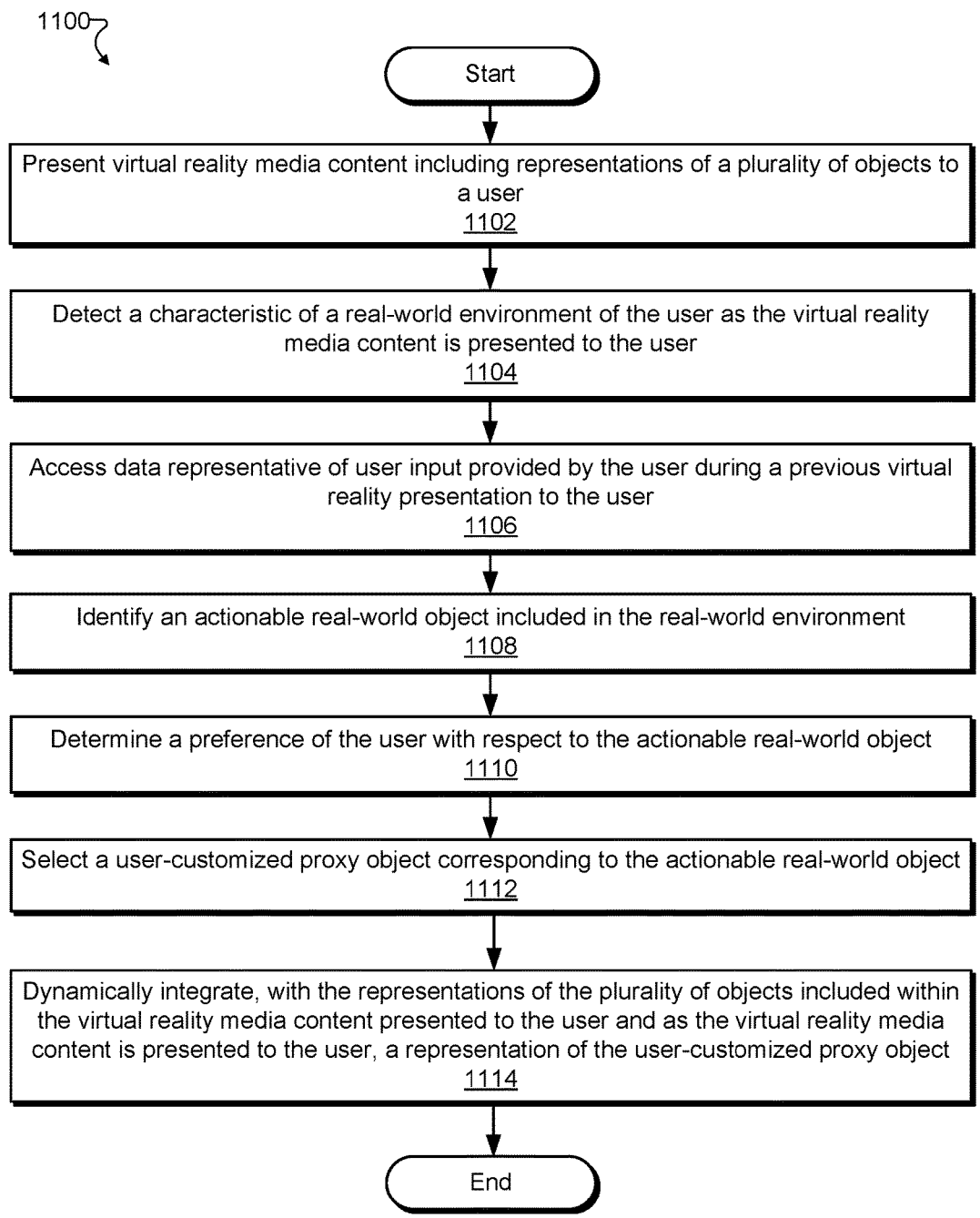

FIG. 11 illustrates an exemplary method 1100 for dynamically representing, within virtual reality media content being presented to a user, a proxy object that corresponds to a real-world object included in a real-world environment of the user. While FIG. 11 illustrates exemplary operations according to one embodiment, other embodiments may omit, add to, reorder, and/or modify any of the operations shown in FIG. 11. One or more of the operations shown in FIG. 11 may be performed by system 100 and/or any implementation thereof.

In operation 1102, a virtual reality system may present virtual reality media content to a user of the virtual reality system. In some examples, the virtual reality media content may include representations of a plurality of objects. Operation 1102 may be performed in any of the ways described herein.

In operation 1104, the virtual reality system may detect a characteristic of a real-world environment of the user as the virtual reality media content is presented to the user. Operation 1104 may be performed in any of the ways described herein.

In operation 1106, the virtual reality system may access data representative of user input provided by the user during a previous virtual reality presentation to the user. For example, the user input may be provided by the user during a previous virtual reality presentation to the user by the virtual reality system. The virtual reality system may store data representative of the user input such that the virtual reality system may access and use the data in future virtual reality presentations. Operation 1106 may be performed in any of the ways described herein.

In operation 1108, the virtual reality system may identify an actionable real-world object included in the real-world environment. For example, the virtual reality system may identify the actionable real-world object based on the characteristic of the real-world environment detected in operation 1104. Operation 1108 may be performed in any of the ways described herein.

In operation 1110, the virtual reality system may determine a preference of the user with respect to the actionable real-world object. For example, the virtual reality system may determine the preference of the user based on the data representative of the user input accessed in operation 1106. Operation 1110 may be performed in any of the ways described herein.

In operation 1112, the virtual reality system may select a user-customized proxy object corresponding to the actionable real-world object. For instance, the virtual reality system may select the user-customized proxy object in response to the identifying of the actionable real-world object in operation 1108 and based on the preference of the user determined in operation 1110. Operation 1112 may be performed in any of the ways described herein.

In operation 1114, the virtual reality system may dynamically integrate a representation of the user-customized proxy object selected in operation 1112 with the representations of the plurality of objects included within the virtual reality media content presented to the user in operation 1102. For example, operation 1114 may be performed in response to the selecting of the user-customized proxy object in operation 1112 and as the virtual reality media content is presented to the user (e.g., as operation 1102 is ongoing). In some examples, the user-customized proxy object dynamically integrated in operation 1114 may be configured to facilitate an action by the user with respect to the actionable real-world object as the virtual reality media content is presented to the user. Operation 1114 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 12:
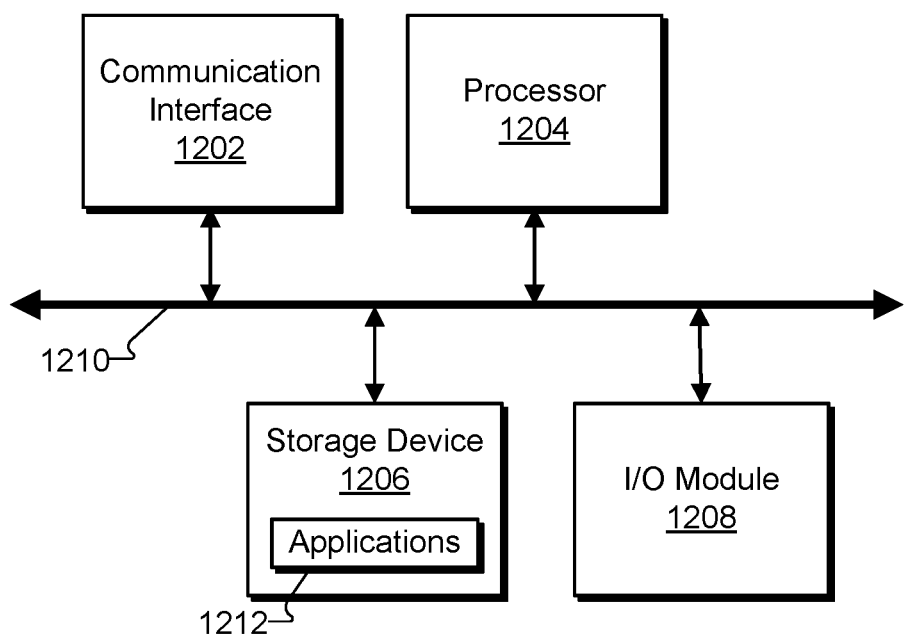
FIG. 12 illustrates an exemplary computing device according to principles described herein.

FIG. 12 illustrates an exemplary computing device 1200 that may be specifically configured to perform one or more of the processes described herein. As shown in FIG. 12, computing device 1200 may include a communication interface 1202, a processor 1204, a storage device 1206, and an input/output ("I/O") module 1208 communicatively connected via a communication infrastructure 1210. While an exemplary computing device 1200 is shown in FIG. 12, the components illustrated in FIG. 12 are not intended to be limiting. Additional or alternative components may be used in other embodiments. Components of computing device 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a modem, an audio/video connection, and any other suitable interface.

Processor 1204 generally represents any type or form of processing unit capable of processing data or interpreting, executing, and/or directing execution of one or more of the instructions, processes, and/or operations described herein. Processor 1204 may direct execution of operations in accordance with one or more applications 1212 or other computer-executable instructions such as may be stored in storage device 1206 or another computer-readable medium.

Storage device 1206 may include one or more data storage media, devices, or configurations and may employ any type, form, and combination of data storage media and/or device. For example, storage device 1206 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1206. For example, data representative of one or more executable applications 1212 configured to direct processor 1204 to perform any of the operations described herein may be stored within storage device 1206. In some examples, data may be arranged in one or more databases residing within storage device 1206.

I/O module 1208 may include one or more I/O modules configured to receive user input and provide user output. One or more I/O modules may be used to receive input for a single virtual reality experience. I/O module 1208 may include any hardware, firmware, software, or combination thereof supportive of input and output capabilities. For example, I/O module 1208 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1200. For example, one or more applications 1212 residing within storage device 1206 may be configured to direct processor 1204 to perform one or more processes or functions associated with facilities 102 or 104 of system 100. Likewise, storage facility 106 of system 100 may be implemented by or within storage device 1206.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   presenting, by a virtual reality system to a user of the virtual reality system, virtual reality media content including representations of a plurality of objects;
   detecting, by the virtual reality system, a characteristic of a real-world environment of the user as the virtual reality media content is presented to the user;
   identifying, by the virtual reality system based on the detected characteristic of the real-world environment, a group of actionable real-world objects included in the real-world environment;
   determining, by the virtual reality system, that the actionable real-world objects in the identified group are to be represented in the virtual reality media content by a single proxy object rather than a plurality of separate proxy objects; and
   dynamically integrating, by the virtual reality system in response to the identifying of the group of actionable real-world objects and based on the determining that the actionable real-world objects in the identified group are to be represented by the single proxy object, the single proxy object with the representations of the plurality of objects included within the virtual reality media content presented to the user, the single proxy object configured to facilitate an action by the user with respect to the group of actionable real-world objects as the virtual reality media content is presented to the user.

2. The method of claim 1, wherein the detecting of the characteristic of the real-world environment is performed by way of a sensor integrated with a media player device included within the virtual reality system.

3. The method of claim 2, wherein the characteristic of the real-world environment detected by way of the sensor integrated with the media player device is one of:
   a depth characterization of the real-world environment detected by way of a depth capture sensor;
   an image characterization of the real-world environment detected by way of an image capture sensor;
   a location of the real-world environment detected by way of a location sensor; and
   an attitude characterization of the media player device with respect to the real-world environment detected by way of an attitude sensor.

4. The method of claim 1, wherein the detecting of the characteristic of the real-world environment is performed by accessing predetermined data representative of the characteristic and determined prior to the presenting of the virtual reality media content to the user.

5. The method of claim 1, embodied as computer-executable instructions on at least one non-transitory computer-readable medium.

6. The method of claim 1, further comprising:
   detecting, by the virtual reality system, an additional characteristic of the real-world environment as the virtual reality media content is presented to the user;
   identifying, by the virtual reality system based on the detected additional characteristic of the real-world environment, an additional actionable real-world object included in the real-world environment; and
   dynamically integrating, by the virtual reality system in response to the identifying of the additional actionable real-world object and as the virtual reality media content is presented to the user, an additional proxy object corresponding to the additional actionable real-world object with the representations of the plurality of objects included within the virtual reality media content presented to the user, the additional proxy object configured to facilitate an action by the user with respect to the additional actionable real-world object as the virtual reality media content is presented to the user.

7. The method of claim 6, wherein the dynamically integrating of the additional proxy object comprises selecting, as the additional proxy object corresponding to the additional actionable real-world object, a virtualized representation of the additional actionable real-world object.

8. The method of claim 6, wherein the dynamically integrating of the additional proxy object comprises selecting, as the additional proxy object corresponding to the additional actionable real-world object, a virtual object selected from a library of virtual objects associated with a theme of the virtual reality media content.

9. The method of claim 6, further comprising detecting, by the virtual reality system and by way of a sensor integrated with a media player device included within the virtual reality system, additional data representative of the additional actionable real-world object;
   wherein:
      the detecting of the additional characteristic of the real-world environment is performed by accessing predetermined data representative of the additional characteristic and determined prior to the presenting of the virtual reality media content to the user;
      the predetermined data representative of the additional characteristic of the real-world environment includes data representative of the additional actionable real-world object that was stored during a previous virtual reality presentation by the virtual reality system; and the identifying of the additional actionable real-world object includes
  identifying the additional actionable real-world object based on the predetermined data representative of the additional actionable real-world object that was stored during the previous virtual reality presentation and the additional data representative of the additional actionable real-world object detected by way of the sensor, and
  updating the data representative of the additional actionable real-world object that was stored during the previous virtual reality presentation to include the additional data representative of the additional actionable real-world object detected by way of the sensor.

10. The method of claim 6, wherein the dynamically integrating of the additional proxy object with the representations of the plurality of objects included within the virtual reality media content presented to the user includes:
  determining a location, within an immersive virtual reality world associated with the virtual reality media content presented to the user, for the additional proxy object to be located within the immersive virtual reality world;
  determining a relative size, with respect to the representations of the plurality of objects included within the virtual reality media content, for the additional proxy object to be sized within the immersive virtual reality world; and
  integrating the additional proxy object into the immersive virtual reality world at the determined location within the immersive virtual reality world and sized at the relative size with respect to the representations of the plurality of objects.

11. The method of claim 10, wherein:
the identifying of the additional actionable real-world object includes
  accessing a library including data representative of a plurality of known real-world objects, and
  identifying the additional actionable real-world object based on the data representative of the plurality of known real-world objects; and
the dynamically integrating of the additional proxy object with the representations of the plurality of objects included within the virtual reality media content presented to the user further includes determining the additional proxy object corresponding to the additional actionable real-world object based on the identifying of the additional actionable real-world object based on the data representative of the plurality of known real-world objects included in the library.

12. A method comprising:
presenting, by a virtual reality system to a user of the virtual reality system, virtual reality media content including representations of a plurality of objects;
detecting, by the virtual reality system, a characteristic of a real-world environment of the user as the virtual reality media content is presented to the user;
accessing, by the virtual reality system, data representative of user input provided by the user during a previous virtual reality presentation to the user by the virtual reality system;
identifying, by the virtual reality system based on the detected characteristic of the real-world environment, a group of actionable real-world objects included in the real-world environment;
determining, by the virtual reality system, that the actionable real-world objects in the identified group are to be represented in the virtual reality media content by a single proxy object rather than a plurality of separate proxy objects;
determining, by the virtual reality system based on the data representative of the user input provided by the user during the previous virtual reality presentation, a preference of the user with respect to the group of actionable real-world objects;
selecting, by the virtual reality system in response to the identifying of the group of actionable real-world objects and in response to the determining that the actionable real-world objects in the identified group are to be represented in the virtual reality media content by the single proxy object and based on the determined preference of the user, a single user-customized proxy object corresponding to the group of actionable real-world objects; and
dynamically integrating, by the virtual reality system in response to the selecting of the single user-customized proxy object and as the virtual reality media content is presented to the user, a representation of the single user-customized proxy object with the representations of the plurality of objects included within the virtual reality media content presented to the user, the single user-customized proxy object configured to facilitate an action by the user with respect to the group of actionable real-world objects as the virtual reality media content is presented to the user.

13. The method of claim 12, embodied as computer-executable instructions on at least one non-transitory computer-readable medium.

14. A virtual reality system comprising:
a processor; and
a memory communicatively coupled with the processor and storing instructions that, when executed by the processor, direct the processor to
  present, to a user of the virtual reality system, virtual reality media content including representations of a plurality of objects;
  detect a characteristic of a real-world environment of the user as the virtual reality media content is presented to the user;
  identify, based on the detected characteristic of the real-world environment, a group of actionable real-world objects included in the real-world environment;
  determine that the actionable real-world objects in the identified group are to be represented in the virtual reality media content by a single proxy object rather than a plurality of separate proxy objects; and
  dynamically integrate, in response to the identifying of the group of actionable real-world objects and based on the determination that the actionable real-world objects in the identified group are to be represented by the single proxy object, the single proxy object with the representations of the plurality of objects included within the virtual reality media content presented to the user, the single proxy object configured to facilitate an action by the user with respect to the group of actionable real-world objects, as the virtual reality media content is presented to the user.

15. The virtual reality system of claim 14, wherein the instructions direct the processor to detect the characteristic of the real-world environment by way of a sensor integrated with a media player device included within the virtual reality system.

16. The virtual reality system of claim 15, wherein the characteristic of the real-world environment detected by way of the sensor integrated with the media player device is one of:
   a depth characterization of the real-world environment detected by way of a depth capture sensor;
   an image characterization of the real-world environment detected by way of an image capture sensor;
   a location of the real-world environment detected by way of a physical location sensor; and
   an attitude characterization of the media player device with respect to the real-world environment detected by way of an attitude sensor.

17. The virtual reality system of claim 14, wherein the instructions that direct the processor to detect the characteristic of the real-world environment include instructions that direct the processor to access predetermined data representative of the characteristic and determined prior to the presentation of the virtual reality media content to the user.

18. The virtual reality system of claim 14, wherein the instructions, when executed by the processor, further direct the processor to:
   detect an additional characteristic of the real-world environment as the virtual reality media content is presented to the user;
   identify, based on the detected additional characteristic of the real-world environment, an additional actionable real-world object included in the real-world environment; and
   dynamically integrate, in response to the identifying of the additional actionable real-world object and as the virtual reality media content is presented to the user, an additional proxy object corresponding to the additional actionable real-world object with the representations of the plurality of objects included within the virtual reality media content presented to the user, the additional proxy object configured to facilitate an action by the user with respect to the additional actionable real-world object as the virtual reality media content is presented to the user.

19. The virtual reality system of claim 18, wherein the instructions that direct the processor to dynamically integrate the additional proxy object with the representations of the plurality of objects include instructions that direct the processor to select, as the additional proxy object corresponding to the additional actionable real-world object, a virtualized representation of the additional actionable real-world object.

20. The virtual reality system of claim 18, wherein the instructions that direct the processor to dynamically integrate of the additional proxy object with the representations of the plurality of objects include instructions that direct the processor to select, as the additional proxy object corresponding to the additional actionable real-world object, a virtual object selected from a library of virtual objects associated with a theme of the virtual reality media content.

21. The virtual reality system of claim 18, wherein:
   the instructions, when executed by the processor, further direct the processor to detect, by way of a sensor integrated with a media player device included within the virtual reality system, additional data representative of the additional actionable real-world object;
   the instructions that direct the processor to detect the additional characteristic of the real-world environment include instructions that direct the processor to access predetermined data representative of the additional characteristic and determined prior to the presentation of the virtual reality media content to the user;
   the predetermined data representative of the additional characteristic of the real-world environment includes data representative of the additional actionable real-world object that was stored during a previous virtual reality presentation by the virtual reality system; and
   the instructions that direct the processor to identify the additional actionable real-world object include instructions that direct the processor to
      identify the additional actionable real-world object based on the predetermined data representative of the additional actionable real-world object that was stored during the previous virtual reality presentation and the additional data representative of the additional actionable real-world object detected by way of the sensor, and
      update the data representative of the additional actionable real-world object that was stored during the previous virtual reality presentation to include the additional data representative of the additional actionable real-world object detected by way of the sensor.

22. The virtual reality system of claim 6, wherein the instructions that direct the processor to dynamically integrate the additional proxy object with the representations of the plurality of objects include instructions that direct the processor to:
   determine a location, within an immersive virtual reality world associated with the virtual reality media content presented to the user, for the additional proxy object to be located within the immersive virtual reality world;
   determine a relative size, with respect to the representations of the plurality of objects included within the virtual reality media content, for the additional proxy object to be sized within the immersive virtual reality world; and
   integrate the additional proxy object into the immersive virtual reality world at the determined location within the immersive virtual reality world and sized at the relative size with respect to the representations of the plurality of objects.

* * * * *